(12) United States Patent
Chae et al.

(10) Patent No.: US 11,378,807 B2
(45) Date of Patent: Jul. 5, 2022

(54) ELECTRONIC DEVICE

(71) Applicant: LG ELECTRONICS INC., Seoul (KR)

(72) Inventors: Hyeongseok Chae, Seoul (KR); Sumin Yoon, Seoul (KR); Kyunghak Park, Seoul (KR); Mundeock Seo, Seoul (KR); Hoon Hur, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 311 days.

(21) Appl. No.: 16/496,362

(22) PCT Filed: Aug. 28, 2019

(86) PCT No.: PCT/KR2019/010979
§ 371 (c)(1),
(2) Date: Sep. 20, 2019

(87) PCT Pub. No.: WO2021/040081
PCT Pub. Date: Mar. 4, 2021

(65) Prior Publication Data
US 2021/0333562 A1 Oct. 28, 2021

(51) Int. Cl.
*G06F 3/14* (2006.01)
*G02B 27/01* (2006.01)
*G06F 3/01* (2006.01)

(52) U.S. Cl.
CPC ......... *G02B 27/0176* (2013.01); *G06F 3/014* (2013.01); *G02B 27/0172* (2013.01); *G02B 2027/0161* (2013.01)

(58) Field of Classification Search
CPC ............ G02B 27/0176; G02B 27/0172; G02B 2027/0161; G06F 3/014
See application file for complete search history.

(56) References Cited

U.S. PATENT DOCUMENTS

2010/0327028 A1* 12/2010 Nakabayashi ..... G02B 27/0176
224/162
2013/0059696 A1  3/2013 Hijmans et al.
2018/0099219 A1*  4/2018 Hope .................... A63F 13/213
2019/0037715 A1*  1/2019 Chen .................... H05K 5/0017

FOREIGN PATENT DOCUMENTS

| JP | 2018057802 | 4/2018 |
| KR | 20180079953 | 7/2018 |
| KR | 20190094308 | 8/2019 |

OTHER PUBLICATIONS

PCT International Application No. PCT/KR2019/010979, International Search Report dated May 27, 2020, 3 pages.

* cited by examiner

*Primary Examiner* — Towfiq Elahi
(74) *Attorney, Agent, or Firm* — Lee Hong Degerman Kang & Waimey

(57) ABSTRACT

An electronic device is disclosed. According to the present disclosure, when the strap portion turns from a first state in which the handle and the strap portion are positioned adjacent to each other to a second state in which the strap portion is positioned away from the handle, the strap portion remains in the second state and, when the link button is pressed, the strap portion turns back to the first state. An electronic device according to the present disclosure may be associated with an artificial intelligence module, robot, augmented reality (AR) device, virtual reality (VR) device, and device related to 5G services.

14 Claims, 20 Drawing Sheets

(a)                      (b)

(a)

(b)

(c)

(d)

(e)

(f)

(a)

(b)

(c)

(d)

(a)

(b)

(c)

(d)

(a)

(b)

(c)

(a)

(b)

ELECTRONIC DEVICE

CROSS-REFERENCE TO RELATED APPLICATIONS

This application is the National Stage filing under 35 U.S.C. 371 of International Application No. PCT/KR2019/010979, filed on Aug. 28, 2019, the contents of which are hereby incorporated by reference herein in its entirety.

TECHNICAL FIELD

Embodiments of the disclosure relate to electronic devices. More specifically, embodiments of the present disclosure relate to a controller that interacts with electronic devices used in, e.g., virtual reality (VR), augmented reality (AR), or mixed reality (MR).

DESCRIPTION OF RELATED ART

Virtual reality (VR) refers to a special environment or situation generated by man-made technology using computer and other devices, which is similar but not exactly equal to the real world.

Augmented reality (AR) refers to the technology that makes a virtual object or information interwoven with the real world, making the virtual object or information perceived as if exists in reality.

Mixed reality (MR) or hybrid reality refers to combining of the real world with virtual objects or information, generating a new environment or new information. In particular, mixed reality refers to the experience that physical and virtual objects interact with each other in real time.

The virtual environment or situation in a sense of mixed reality stimulates the five senses of a user, allows the user to have a spatio-temporal experience similar to the one perceived from the real world, and thereby allows the user to freely cross the boundary between reality and imagination. Also, the user may not only get immersed in such an environment but also interact with objects implemented in the environment by manipulating or giving a command to the objects through an actual device.

Recently underway are vigorous research efforts for gear used in such industry sectors; particularly, head-mounted display (HMDs) and HMD-interacting controllers. HMD refers to a type of digital device that is worn on the user's head, as are glasses or helmets, to allow the user to view multimedia content, and controller means an assistant digital device that an HMD-wearing user holds in her hand to execute content provided from the HMD when experiencing augmented reality (AR) and virtual reality (VR).

By its nature, the controller is portable and is prone to hit other objects or escape off the user's hand when the HMD-wearing user moves her hand to manipulate content. To avoid such circumstances, the controller typically comes with a strap portion which may hold the controller in the user's hand.

However, it is not easy for the user to put the strap portion on her hand with the HMD worn on her head, with the result that the controller is uncomfortable to hold or manipulate.

Conventionally, a module for adjusting the tension of the strap portion is embedded in the controller. However, such module is bulky, forcing the controller to be made in larger size and volume and hence causing inconvenience in use of the controller.

SUMMARY

An object of the present disclosure is to provide an electronic device for use in virtual reality (VR), augmented reality (AR), or mixed reality (MR), which is capable of easily adjusting the tension of a strap portion provided with a controller upon using the electronic device.

Another object of the present disclosure is to provide an electronic device with a strap tension adjuster minimized in size and volume.

According to an embodiment of the present disclosure, an electronic device comprises a strap portion of which both ends are connected to a handle of the electronic device and a strap tension adjuster disposed inside the handle, wherein the strap tension adjuster includes a link button disposed to partially protrude to an outside of the handle and a first spring connected with one end of the strap portion, wherein when the strap portion turns from a first state in which the handle and the strap portion are positioned adjacent to each other to a second state in which the strap portion is positioned away from the handle, the strap portion remains in the second state and, when the link button is pressed, the strap portion turns back to the first state.

The strap tension adjuster may further include a first gear around which the first spring is wound, the first gear spinnable in a first direction. When the link button is pressed, the first gear is spinnable in a second direction opposite to the first direction.

The first gear may include first sawteeth with first slope surfaces inclined in the first direction.

The strap tension adjuster may further include a second gear coupled and unspinnably fastened to the link button.

The second gear may further include second sawteeth with second slope surfaces inclined in the second direction. The first sawteeth and the second sawteeth may be symmetrically positioned, so that the first slope surfaces face the second slope surfaces.

The second gear may include a receiving groove for receiving a portion of the link button.

The receiving groove may have openings formed in both ends thereof to allow the portion of the link button to move along a straight line inside the receiving groove.

The portion of the link button may include a first arm.

The first arm may be longer than the receiving groove. The first arm may be disposed to be slidable in the receiving groove. As the link button is pressed, the first arm may push the first gear away from the second gear.

The first spring may be a spiral spring.

The first spring may be disposed so that a central axis of the first spring is coaxial with a rotation axis of the first gear.

The strap tension adjuster may further include a second spring elastically supporting the first gear. The second spring may be disposed so that a central axis of the second spring is coaxial with a rotation axis of the first gear.

The second spring may be positioned inside the first gear.

The electronic device may further include a pin supporting the first gear and the second gear to be placed in a predetermined position inside the handle. The pin may be disposed inside the handle so that a central axis of the pin is coaxial with the rotation axis of the first gear.

The pin may pass through the first gear and the second gear along the rotation axis of the first gear. The second spring may be coupled with the pin.

One end, or both ends, of the pin may be fastened to an inner wall of the handle.

The electronic device may further include a connecting element connecting an end of the strap portion with the first spring.

Another end of the strap portion may be rotatably connected to the handle

According to embodiments of the present disclosure, the electronic device may easily adjust the tension between the strap frame and the controller by simply applying an external force to the strap frame, thus allowing the user to hold and use the controller in a comfortable manner.

According to embodiments of the disclosure, the controller includes the strap tension adjuster minimized in size and volume, allowing it to be made as compact as possible and used in a significantly convenient way.

DETAILED DESCRIPTION OF EXEMPLARY EMBODIMENTS

Figure 1:
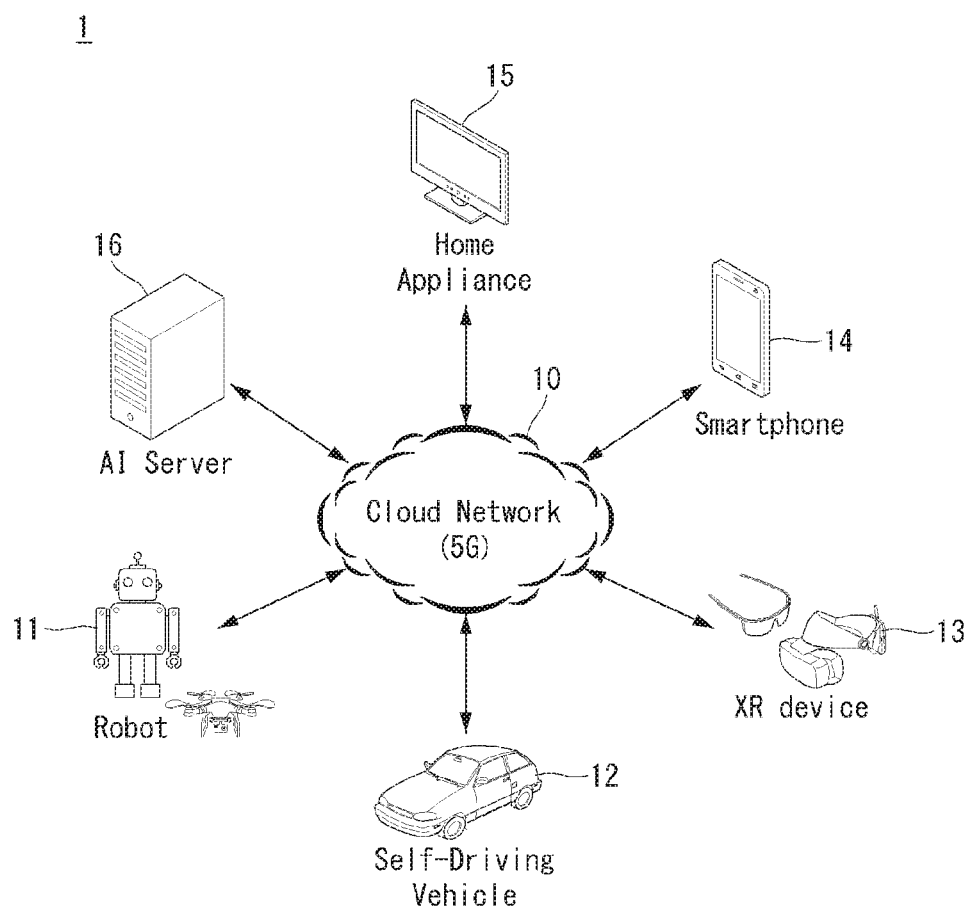
FIG. 1 is a concept view illustrating an example 5G network environment in which heterogeneous electronic devices are connected to a cloud network, according to an embodiment of the present disclosure.

In what follows, embodiments disclosed in this document will be described in detail with reference to appended drawings, where the same or similar constituent elements are given the same reference number irrespective of their drawing symbols, and repeated descriptions thereof will be omitted.

In describing an embodiment disclosed in the present specification, if a constituting element is said to be "connected" or "attached" to other constituting element, it should be understood that the former may be connected or attached directly to the other constituting element, but there may be a case in which another constituting element is present between the two constituting elements.

Also, in describing an embodiment disclosed in the present document, if it is determined that a detailed description of a related art incorporated herein unnecessarily obscure the gist of the embodiment, the detailed description thereof will be omitted. Also, it should be understood that the appended drawings are intended only to help understand embodiments disclosed in the present document and do not limit the technical principles and scope of the present disclosure; rather, it should be understood that the appended drawings include all of the modifications, equivalents or substitutes described by the technical principles and belonging to the technical scope of the present disclosure.

[5G Scenario]

The three main requirement areas in the 5G system are (1) enhanced Mobile Broadband (eMBB) area, (2) massive Machine Type Communication (mMTC) area, and (3) Ultra-Reliable and Low Latency Communication (URLLC) area.

Some use case may require a plurality of areas for optimization, but other use case may focus only one Key Performance Indicator (KPI). The 5G system supports various use cases in a flexible and reliable manner.

eMBB far surpasses the basic mobile Internet access, supports various interactive works, and covers media and entertainment applications in the cloud computing or augmented reality environment. Data is one of core driving elements of the 5G system, which is so abundant that for the first time, the voice-only service may be disappeared. In the 5G, voice is expected to be handled simply by an application program using a data connection provided by the communication system. Primary causes of increased volume of traffic are increase of content size and increase of the number of applications requiring a high data transfer rate. Streaming service (audio and video), interactive video, and mobile Internet connection will be more heavily used as more and more devices are connected to the Internet. These application programs require always-on connectivity to push real-time information and notifications to the user. Cloud-based storage and applications are growing rapidly in the mobile communication platforms, which may be applied to both of business and entertainment uses. And the cloud-based storage is a special use case that drives growth of uplink data transfer rate. The 5G is also used for cloud-based remote works and requires a much shorter end-to-end latency to ensure excellent user experience when a tactile interface is used. Entertainment, for example, cloud-based game and video streaming, is another core element that strengthens the requirement for mobile broadband capability. Entertainment is essential for smartphones and tablets in any place including a high mobility environment such as a train, car, and plane. Another use case is augmented reality for entertainment and information search. Here, augmented reality requires very low latency and instantaneous data transfer.

Also, one of highly expected 5G use cases is the function that connects embedded sensors seamlessly in every possible area, namely the use case based on mMTC. Up to 2020, the number of potential IoT devices is expected to reach 20.4 billion. Industrial IoT is one of key areas where the 5G performs a primary role to maintain infrastructure for smart city, asset tracking, smart utility, agriculture and security.

URLLC includes new services which may transform industry through ultra-reliable/ultra-low latency links, such as remote control of major infrastructure and self-driving cars. The level of reliability and latency are essential for smart grid control, industry automation, robotics, and drone control and coordination.

Next, a plurality of use cases will be described in more detail.

The 5G may complement Fiber-To-The-Home (FTTH) and cable-based broadband (or DOCSIS) as a means to provide a stream estimated to occupy hundreds of megabits per second up to gigabits per second. This fast speed is required not only for virtual reality and augmented reality but also for transferring video with a resolution more than 4K (6K, 8K or more). VR and AR applications almost always include immersive sports games. Specific application programs may require a special network configuration. For example, in the case of VR game, to minimize latency, game service providers may have to integrate a core server with the edge network service of the network operator.

Automobiles are expected to be a new important driving force for the 5G system together with various use cases of mobile communication for vehicles. For example, entertainment for passengers requires high capacity and high mobile broadband at the same time. This is so because users continue to expect a high-quality connection irrespective of their location and moving speed. Another use case in the automotive field is an augmented reality dashboard. The augmented reality dashboard overlays information, which is a perception result of an object in the dark and contains distance to the object and object motion, on what is seen through the front window. In a future, a wireless module enables communication among vehicles, information exchange between a vehicle and supporting infrastructure, and information exchange among a vehicle and other connected devices (for example, devices carried by a pedestrian). A safety system guides alternative courses of driving so that a driver may drive his or her vehicle more safely and to reduce the risk of accident. The next step will be a remotely driven or self-driven vehicle. This step requires highly reliable and highly fast communication between different self-driving vehicles and between a self-driving vehicle and infrastructure. In the future, it is expected that a self-driving vehicle takes care of all of the driving activities while a human driver focuses on dealing with an abnormal driving situation that the self-driving vehicle is unable to recognize. Technical requirements of a self-driving vehicle demand ultra-low latency and ultra-fast reliability up to the level that traffic safety may not be reached by human drivers.

The smart city and smart home, which are regarded as essential to realize a smart society, will be embedded into a high-density wireless sensor network. Distributed networks comprising intelligent sensors may identify conditions for cost-efficient and energy-efficient conditions for maintaining cities and homes. A similar configuration may be applied for each home. Temperature sensors, window and heating controllers, anti-theft alarm devices, and home appliances will be all connected wirelessly. Many of these sensors typified with a low data transfer rate, low power, and low cost. However, for example, real-time HD video may require specific types of devices for the purpose of surveillance.

As consumption and distribution of energy including heat or gas is being highly distributed, automated control of a distributed sensor network is required. A smart grid collects information and interconnect sensors by using digital information and communication technologies so that the distributed sensor network operates according to the collected information. Since the information may include behaviors of energy suppliers and consumers, the smart grid may help improving distribution of fuels such as electricity in terms of efficiency, reliability, economics, production sustainability, and automation. The smart grid may be regarded as a different type of sensor network with a low latency.

The health-care sector has many application programs that may benefit from mobile communication. A communication system may support telemedicine providing a clinical care from a distance. Telemedicine may help reduce barriers to distance and improve access to medical services that are not readily available in remote rural areas. It may also be used to save lives in critical medical and emergency situations. A wireless sensor network based on mobile communication may provide remote monitoring and sensors for parameters such as the heart rate and blood pressure.

Wireless and mobile communication are becoming increasingly important for industrial applications. Cable wiring requires high installation and maintenance costs. Therefore, replacement of cables with reconfigurable wireless links is an attractive opportunity for many industrial applications. However, to exploit the opportunity, the wireless connection is required to function with a latency similar to that in the cable connection, to be reliable and of large capacity, and to be managed in a simple manner Low latency and very low error probability are new requirements that lead to the introduction of the 5G system.

Logistics and freight tracking are important use cases of mobile communication, which require tracking of an inventory and packages from any place by using location-based information system. The use of logistics and freight tracking typically requires a low data rate but requires large-scale and reliable location information.

The present disclosure to be described below may be implemented by combining or modifying the respective embodiments to satisfy the aforementioned requirements of the 5G system.

FIG. 1 illustrates one embodiment of an AI device.

Referring to FIG. 1, in the AI system, at least one or more of an AI server 16, robot 11, self-driving vehicle 12, XR device 13, smartphone 14, or home appliance 15 are connected to a cloud network 10. Here, the robot 11, self-driving vehicle 12, XR device 13, smartphone 14, or home appliance 15 to which the AI technology has been applied may be referred to as an AI device (11 to 15).

The cloud network 10 may comprise part of the cloud computing infrastructure or refer to a network existing in the cloud computing infrastructure. Here, the cloud network 10 may be constructed by using the 3G network, 4G or Long Term Evolution (LTE) network, or 5G network.

In other words, individual devices (11 to 16) constituting the AI system may be connected to each other through the cloud network 10. In particular, each individual device (11 to 16) may communicate with each other through the eNB but may communicate directly to each other without relying on the eNB.

The AI server 16 may include a server performing AI processing and a server performing computations on big data.

The AI server 16 may be connected to at least one or more of the robot 11, self-driving vehicle 12, XR device 13, smartphone 14, or home appliance 15, which are AI devices constituting the AI system, through the cloud network 10 and may help at least part of AI processing conducted in the connected AI devices (11 to 15).

At this time, the AI server 16 may teach the artificial neural network according to a machine learning algorithm on behalf of the AI device (11 to 15), directly store the learning model, or transmit the learning model to the AI device (11 to 15).

At this time, the AI server 16 may receive input data from the AI device (11 to 15), infer a result value from the received input data by using the learning model, generate a response or control command based on the inferred result value, and transmit the generated response or control command to the AI device (11 to 15).

Similarly, the AI device (11 to 15) may infer a result value from the input data by employing the learning model directly and generate a response or control command based on the inferred result value.

<AI+Robot>

By employing the AI technology, the robot 11 may be implemented as a guide robot, transport robot, cleaning robot, wearable robot, entertainment robot, pet robot, or unmanned flying robot.

The robot 11 may include a robot control module for controlling its motion, where the robot control module may correspond to a software module or a chip which implements the software module in the form of a hardware device.

The robot 11 may obtain status information of the robot 11, detect (recognize) the surroundings and objects, generate map data, determine a travel path and navigation plan, determine a response to user interaction, or determine motion by using sensor information obtained from various types of sensors.

Here, the robot 11 may use sensor information obtained from at least one or more sensors among lidar, radar, and camera to determine a travel path and navigation plan.

The robot 11 may perform the operations above by using a learning model built on at least one or more artificial neural networks. For example, the robot 11 may recognize the surroundings and objects by using the learning model and determine its motion by using the recognized surroundings or object information. Here, the learning model may be the one trained by the robot 11 itself or trained by an external device such as the AI server 16.

At this time, the robot 11 may perform the operation by generating a result by employing the learning model directly but also perform the operation by transmitting sensor information to an external device such as the AI server 16 and receiving a result generated accordingly.

The robot 11 may determine a travel path and navigation plan by using at least one or more of object information detected from the map data and sensor information or object information obtained from an external device and navigate according to the determined travel path and navigation plan by controlling its locomotion platform.

Map data may include object identification information about various objects disposed in the space in which the robot 11 navigates. For example, the map data may include object identification information about static objects such as wall and doors and movable objects such as a flowerpot and a desk. And the object identification information may include the name, type, distance, location, and so on.

Also, the robot 11 may perform the operation or navigate the space by controlling its locomotion platform based on the control/interaction of the user. At this time, the robot 11 may obtain intention information of the interaction due to the user's motion or voice command and perform an operation by determining a response based on the obtained intention information.

<AI+Autonomous Navigation>

By employing the AI technology, the self-driving vehicle 12 may be implemented as a mobile robot, unmanned ground vehicle, or unmanned aerial vehicle.

The self-driving vehicle 12 may include an autonomous navigation module for controlling its autonomous navigation function, where the autonomous navigation control module may correspond to a software module or a chip which implements the software module in the form of a hardware device. The autonomous navigation control module may be installed inside the self-driving vehicle 12 as a constituting element thereof or may be installed outside the self-driving vehicle 12 as a separate hardware component.

The self-driving vehicle 12 may obtain status information of the self-driving vehicle 12, detect (recognize) the surroundings and objects, generate map data, determine a travel path and navigation plan, or determine motion by using sensor information obtained from various types of sensors.

Like the robot 11, the self-driving vehicle 12 may use sensor information obtained from at least one or more sensors among lidar, radar, and camera to determine a travel path and navigation plan.

In particular, the self-driving vehicle 12 may recognize an occluded area or an area extending over a predetermined distance or objects located across the area by collecting sensor information from external devices or receive recognized information directly from the external devices.

The self-driving vehicle 12 may perform the operations above by using a learning model built on at least one or more artificial neural networks. For example, the self-driving vehicle 12 may recognize the surroundings and objects by using the learning model and determine its navigation route by using the recognized surroundings or object information. Here, the learning model may be the one trained by the self-driving vehicle 12 itself or trained by an external device such as the AI server 16.

At this time, the self-driving vehicle 12 may perform the operation by generating a result by employing the learning model directly but also perform the operation by transmitting sensor information to an external device such as the AI server 16 and receiving a result generated accordingly.

The self-driving vehicle 12 may determine a travel path and navigation plan by using at least one or more of object information detected from the map data and sensor information or object information obtained from an external device and navigate according to the determined travel path and navigation plan by controlling its driving platform.

Map data may include object identification information about various objects disposed in the space (for example, road) in which the self-driving vehicle 12 navigates. For example, the map data may include object identification information about static objects such as streetlights, rocks and buildings and movable objects such as vehicles and pedestrians. And the object identification information may include the name, type, distance, location, and so on.

Also, the self-driving vehicle 12 may perform the operation or navigate the space by controlling its driving platform based on the control/interaction of the user. At this time, the self-driving vehicle 12 may obtain intention information of the interaction due to the user's motion or voice command and perform an operation by determining a response based on the obtained intention information.

<AI+XR>

By employing the AI technology, the XR device 13 may be implemented as a Head-Mounted Display (HMD), Head-Up Display (HUD) installed at the vehicle, TV, mobile phone, smartphone, computer, wearable device, home appliance, digital signage, vehicle, robot with a fixed platform, or mobile robot.

The XR device 13 may obtain information about the surroundings or physical objects by generating position and attribute data about 3D points by analyzing 3D point cloud or image data acquired from various sensors or external devices and output objects in the form of XR objects by rendering the objects for display.

The XR device 13 may perform the operations above by using a learning model built on at least one or more artificial neural networks. For example, the XR device 13 may recognize physical objects from 3D point cloud or image data by using the learning model and provide information corresponding to the recognized physical objects. Here, the learning model may be the one trained by the XR device 13 itself or trained by an external device such as the AI server 16.

At this time, the XR device 13 may perform the operation by generating a result by employing the learning model directly but also perform the operation by transmitting sensor information to an external device such as the AI server 16 and receiving a result generated accordingly.

<AI+Robot+Autonomous Navigation>

By employing the AI and autonomous navigation technologies, the robot 11 may be implemented as a guide robot, transport robot, cleaning robot, wearable robot, entertainment robot, pet robot, or unmanned flying robot.

The robot 11 employing the AI and autonomous navigation technologies may correspond to a robot itself having an autonomous navigation function or a robot 11 interacting with the self-driving vehicle 12.

The robot 11 having the autonomous navigation function may correspond collectively to the devices which may move autonomously along a given path without control of the user or which may move by determining its path autonomously.

The robot 11 and the self-driving vehicle 12 having the autonomous navigation function may use a common sensing method to determine one or more of the travel path or navigation plan. For example, the robot 11 and the self-driving vehicle 12 having the autonomous navigation function may determine one or more of the travel path or navigation plan by using the information sensed through lidar, radar, and camera.

The robot 11 interacting with the self-driving vehicle 12, which exists separately from the self-driving vehicle 12, may be associated with the autonomous navigation function inside or outside the self-driving vehicle 12 or perform an operation associated with the user riding the self-driving vehicle 12.

At this time, the robot 11 interacting with the self-driving vehicle 12 may obtain sensor information in place of the self-driving vehicle 12 and provide the sensed information to the self-driving vehicle 12; or may control or assist the autonomous navigation function of the self-driving vehicle 12 by obtaining sensor information, generating information of the surroundings or object information, and providing the generated information to the self-driving vehicle 12.

Also, the robot 11 interacting with the self-driving vehicle 12 may control the function of the self-driving vehicle 12 by monitoring the user riding the self-driving vehicle 12 or through interaction with the user. For example, if it is determined that the driver is drowsy, the robot 11 may activate the autonomous navigation function of the self-driving vehicle 12 or assist the control of the driving platform of the self-driving vehicle 12. Here, the function of the self-driving vehicle 12 controlled by the robot 12 may include not only the autonomous navigation function but also the navigation system installed inside the self-driving vehicle 12 or the function provided by the audio system of the self-driving vehicle 12.

Also, the robot 11 interacting with the self-driving vehicle 12 may provide information to the self-driving vehicle 12 or assist functions of the self-driving vehicle 12 from the outside of the self-driving vehicle 12. For example, the robot 11 may provide traffic information including traffic sign information to the self-driving vehicle 12 like a smart traffic light or may automatically connect an electric charger to the charging port by interacting with the self-driving vehicle 12 like an automatic electric charger of the electric vehicle.

<AI+Robot+XR>

By employing the AI technology, the robot 11 may be implemented as a guide robot, transport robot, cleaning robot, wearable robot, entertainment robot, pet robot, or unmanned flying robot.

The robot 11 employing the XR technology may correspond to a robot which acts as a control/interaction target in the XR image. In this case, the robot 11 may be distinguished from the XR device 13, both of which may operate in conjunction with each other.

If the robot 11, which acts as a control/interaction target in the XR image, obtains sensor information from the sensors including a camera, the robot 11 or XR device 13 may generate an XR image based on the sensor information, and the XR device 13 may output the generated XR image. And the robot 11 may operate based on the control signal received through the XR device 13 or based on the interaction with the user.

For example, the user may check the XR image corresponding to the viewpoint of the robot 11 associated remotely through an external device such as the XR device 13, modify the navigation path of the robot 11 through interaction, control the operation or navigation of the robot 11, or check the information of nearby objects.

<AI+Autonomous Navigation+XR>

By employing the AI and XR technologies, the self-driving vehicle 12 may be implemented as a mobile robot, unmanned ground vehicle, or unmanned aerial vehicle.

The self-driving vehicle 12 employing the XR technology may correspond to a self-driving vehicle having a means for providing XR images or a self-driving vehicle which acts as a control/interaction target in the XR image. In particular, the self-driving vehicle 12 which acts as a control/interaction target in the XR image may be distinguished from the XR device 13, both of which may operate in conjunction with each other.

The self-driving vehicle 12 having a means for providing XR images may obtain sensor information from sensors including a camera and output XR images generated based on the sensor information obtained. For example, by displaying an XR image through HUD, the self-driving vehicle 12 may provide XR images corresponding to physical objects or image objects to the passenger.

At this time, if an XR object is output on the HUD, at least part of the XR object may be output so as to be overlapped with the physical object at which the passenger gazes. On the other hand, if an XR object is output on a display installed inside the self-driving vehicle 12, at least part of the XR object may be output so as to be overlapped with an image object. For example, the self-driving vehicle 12 may output XR objects corresponding to the objects such as roads, other vehicles, traffic lights, traffic signs, bicycles, pedestrians, and buildings.

If the self-driving vehicle 12, which acts as a control/interaction target in the XR image, obtains sensor information from the sensors including a camera, the self-driving vehicle 12 or XR device 13 may generate an XR image based on the sensor information, and the XR device 13 may output the generated XR image. And the self-driving vehicle 12 may operate based on the control signal received through an external device such as the XR device 13 or based on the interaction with the user.

[Extended Reality Technology]

eXtended Reality (XR) refers to all of Virtual Reality (VR), Augmented Reality (AR), and Mixed Reality (MR).

The VR technology provides objects or backgrounds of the real world only in the form of CG images, AR technology provides virtual CG images overlaid on the physical object images, and MR technology employs computer graphics technology to mix and merge virtual objects with the real world.

MR technology is similar to AR technology in a sense that physical objects are displayed together with virtual objects. However, while virtual objects supplement physical objects in the AR, virtual and physical objects co-exist as equivalents in the MR.

The XR technology may be applied to Head-Mounted Display (HMD), Head-Up Display (HUD), mobile phone, tablet PC, laptop computer, desktop computer, TV, digital signage, and so on, where a device employing the XR technology may be called an XR device.

In what follows, an electronic device providing XR according to an embodiment of the present disclosure will be described.

Figure 2:
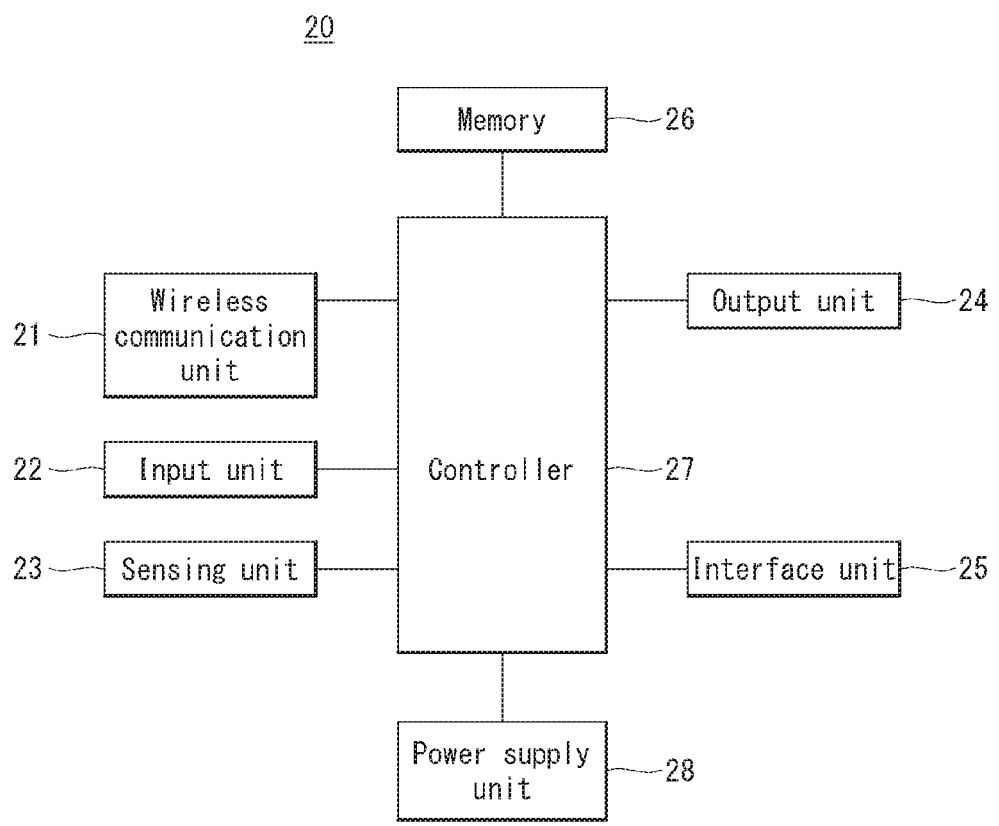
FIG. 2 is a block diagram illustrating the structure of an eXtended Reality (XR) electronic device according to one embodiment of the present disclosure.

FIG. 2 is a block diagram illustrating the structure of an XR electronic device 20 according to one embodiment of the present disclosure.

Referring to FIG. 2, the XR electronic device 20 may include a wireless communication unit 21, input unit 22, sensing unit 23, output unit 24, interface unit 25, memory 26, controller 27, and power supply unit 28. The constituting elements shown in FIG. 2 are not essential for implementing the electronic device 20, and therefore, the electronic device 20 described in this document may have more or fewer constituting elements than those listed above.

More specifically, among the constituting elements above, the wireless communication unit 21 may include one or more modules which enable wireless communication between the electronic device 20 and a wireless communication system, between the electronic device 20 and other electronic device, or between the electronic device 20 and an external server. Also, the wireless communication unit 21 may include one or more modules that connect the electronic device 20 to one or more networks.

The wireless communication unit 21 may include at least one of a broadcast receiving module, mobile communication module, wireless Internet module, short-range communication module, and location information module.

The input unit 22 may include a camera or image input unit for receiving an image signal, microphone or audio input unit for receiving an audio signal, and user input unit (for example, touch key) for receiving information from the user, and push key (for example, mechanical key). Voice data or image data collected by the input unit 22 may be analyzed and processed as a control command of the user.

The sensing unit 23 may include one or more sensors for sensing at least one of the surroundings of the electronic device 20 and user information.

For example, the sensing unit 23 may include at least one of a proximity sensor, illumination sensor, touch sensor, acceleration sensor, magnetic sensor, G-sensor, gyroscope sensor, motion sensor, RGB sensor, infrared (IR) sensor, finger scan sensor, ultrasonic sensor, optical sensor (for example, image capture means), microphone, battery gauge, environment sensor (for example, barometer, hygrometer, radiation detection sensor, heat detection sensor, and gas detection sensor), and chemical sensor (for example, electronic nose, health-care sensor, and biometric sensor). Meanwhile, the electronic device 20 disclosed in the present specification may utilize information collected from at least two or more sensors listed above.

The output unit 24 is intended to generate an output related to a visual, aural, or tactile stimulus and may include at least one of a display unit, sound output unit, haptic module, and optical output unit. The display unit may implement a touchscreen by forming a layered structure or being integrated with touch sensors. The touchscreen may not only function as a user input means for providing an input interface between the AR electronic device 20 and the user but also provide an output interface between the AR electronic device 20 and the user.

The interface unit 25 serves as a path to various types of external devices connected to the electronic device 20. Through the interface unit 25, the electronic device 20 may receive VR or AR content from an external device and perform interaction by exchanging various input signals, sensing signals, and data.

For example, the interface unit 25 may include at least one of a wired/wireless headset port, external charging port, wired/wireless data port, memory card port, port for connecting to a device equipped with an identification module, audio Input/Output (I/O) port, video I/O port, and earphone port.

Also, the memory 26 stores data supporting various functions of the electronic device 20. The memory 26 may store a plurality of application programs (or applications) executed in the electronic device 20; and data and commands for operation of the electronic device 20. Also, at least part of the application programs may be pre-installed at the electronic device 20 from the time of factory shipment for basic functions (for example, incoming and outgoing call function and message reception and transmission function) of the electronic device 20.

The controller 27 usually controls the overall operation of the electronic device 20 in addition to the operation related to the application program. The controller 27 may process signals, data, and information input or output through the constituting elements described above.

Also, the controller 27 may provide relevant information or process a function for the user by executing an application program stored in the memory 26 and controlling at least part of the constituting elements. Furthermore, the controller 27 may combine and operate at least two or more constituting elements among those constituting elements included in the electronic device 20 to operate the application program.

Also, the controller 27 may detect the motion of the electronic device 20 or user by using a gyroscope sensor, g-sensor, or motion sensor included in the sensing unit 23. Also, the controller 27 may detect an object approaching the vicinity of the electronic device 20 or user by using a proximity sensor, illumination sensor, magnetic sensor, infrared sensor, ultrasonic sensor, or light sensor included in the sensing unit 23. Besides, the controller 27 may detect the motion of the user through sensors installed at the controller operating in conjunction with the electronic device 20.

Also, the controller 27 may perform the operation (or function) of the electronic device 20 by using an application program stored in the memory 26.

The power supply unit 28 receives external or internal power under the control of the controller 27 and supplies the power to each and every constituting element included in the electronic device 20. The power supply unit 28 includes battery, which may be provided in a built-in or replaceable form.

At least part of the constituting elements described above may operate in conjunction with each other to implement the operation, control, or control method of the electronic device according to various embodiments described below. Also, the operation, control, or control method of the electronic device may be implemented on the electronic device by executing at least one application program stored in the memory 26.

In what follows, the electronic device according to one embodiment of the present disclosure will be described with reference to an example where the electronic device is applied to a Head Mounted Display (HMD). However, embodiments of the electronic device according to the present disclosure may include a mobile phone, smartphone, laptop computer, digital broadcast terminal, Personal Digital Assistant (PDA), Portable Multimedia Player (PMP), navigation terminal, slate PC, tablet PC, ultrabook, and wearable device. Wearable devices may include smart watch and contact lens in addition to the HMD.

Figure 3:
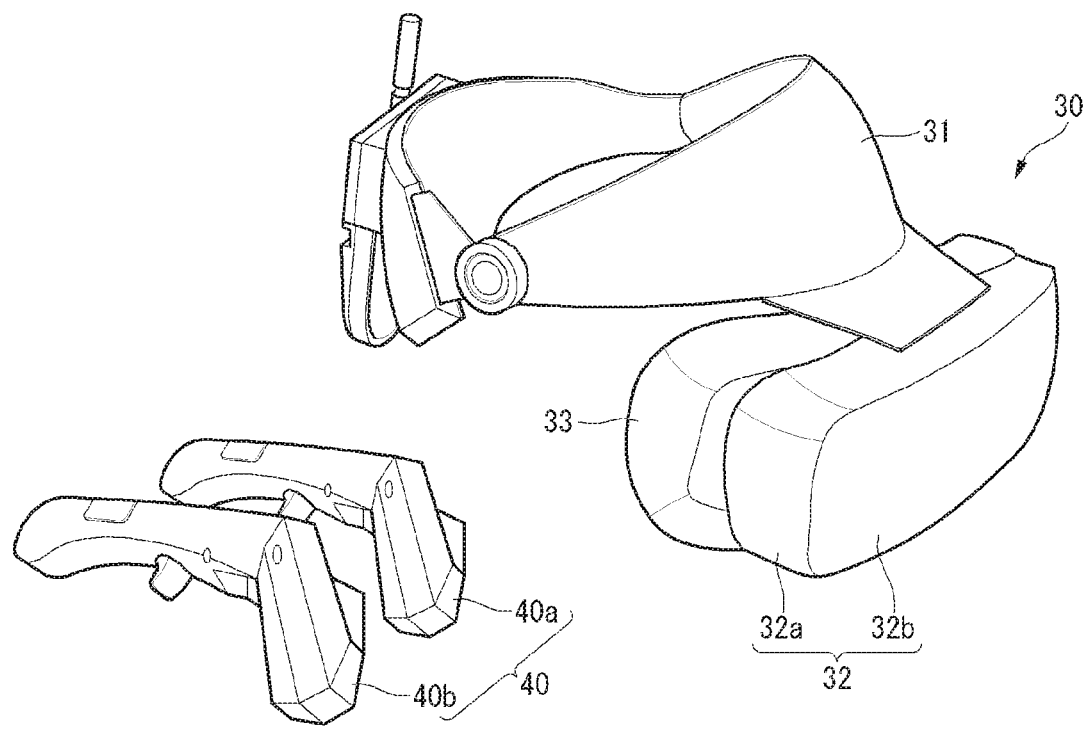
FIG. 3 is a perspective view of a VR electronic device according to one embodiment of the present disclosure.
Figure 4:
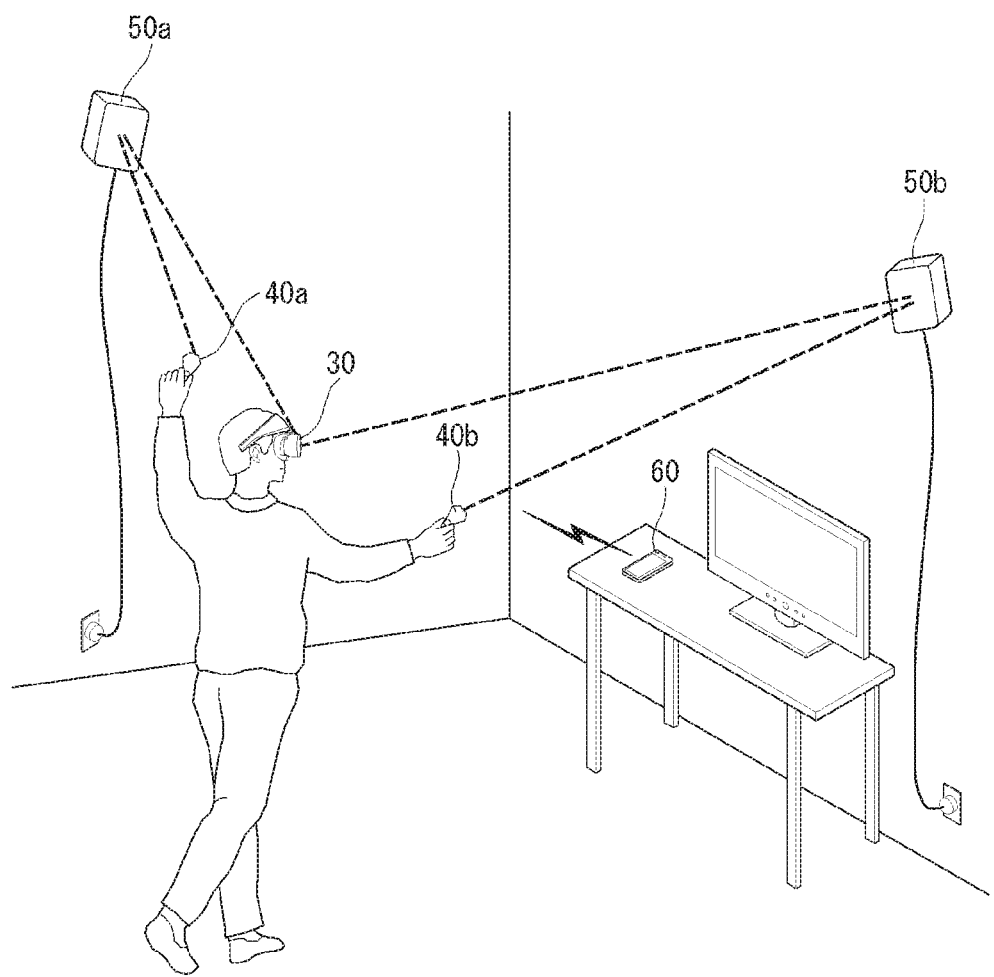
FIG. 4 illustrates a situation in which the VR electronic device of FIG. 3 is used.

FIG. 3 is a perspective view of a VR electronic device according to one embodiment of the present disclosure, and FIG. 4 illustrates a situation in which the VR electronic device of FIG. 3 is used.

Referring to the figures, a VR electronic device may include a box-type electronic device 30 mounted on the head of the user and a controller 40 (40a, 40b) that the user may grip and manipulate.

The electronic device 30 includes a head unit 31 worn and supported on the head and a display unit 32 being combined with the head unit 31 and displaying a virtual image or video in front of the user's eyes. Although the figure shows that the head unit 31 and display unit 32 are made as separate units and combined together, the display unit 32 may also be formed being integrated into the head unit 31.

The head unit 31 may assume a structure of enclosing the head of the user so as to disperse the weight of the display unit 32. And to accommodate different head sizes of users, the head unit 31 may provide a band of variable length.

The display unit 32 includes a cover unit 32a combined with the head unit 31 and a display unit 32b containing a display panel.

The cover unit 32a is also called a goggle frame and may have the shape of a tub as a whole. The cover unit 32a has a space formed therein, and an opening is formed at the front surface of the cover unit, the position of which corresponds to the eyeballs of the user.

The display unit 32b is installed on the front surface frame of the cover unit 32a and disposed at the position corresponding to the eyes of the user to display screen information (image or video). The screen information output on the display unit 32b includes not only VR content but also external images collected through an image capture means such as a camera.

And VR content displayed on the display unit 32b may be the content stored in the electronic device 30 itself or the content stored in an external device 60. For example, when the screen information is an image of the virtual world stored in the electronic device 30, the electronic device 30 may perform image processing and rendering to process the image of the virtual world and display image information generated from the image processing and rendering through the display unit 32b. On the other hand, in the case of a VR image stored in the external device 60, the external device 60 performs image processing and rendering and transmits image information generated from the image processing and rendering to the electronic device 30. Then the electronic device 30 may output 3D image information received from the external device 60 through the display unit 32b.

The display unit 32b may include a display panel installed at the front of the opening of the cover unit 32a, where the display panel may be an LCD or OLED panel. Similarly, the display unit 32b may be a display unit of a smartphone. In other words, the display unit 32b may have a specific structure in which a smartphone may be attached to or detached from the front of the cover unit 32a.

And an image capture means and various types of sensors may be installed at the front of the display unit 32.

The image capture means (for example, camera) is formed to capture (receive or input) the image of the front and may obtain a real world as seen by the user as an image. One image capture means may be installed at the center of the display unit 32b, or two or more of them may be installed at symmetric positions. When a plurality of image capture means are installed, a stereoscopic image may be obtained. An image combining an external image obtained from an image capture means with a virtual image may be displayed through the display unit 32b.

Various types of sensors may include a gyroscope sensor, motion sensor, or IR sensor. Various types of sensors will be described in more detail later.

At the rear of the display unit 32, a facial pad 33 may be installed. The facial pad 33 is made of cushioned material and is fit around the eyes of the user, providing comfortable fit to the face of the user. And the facial pad 33 is made of a flexible material with a shape corresponding to the front contour of the human face and may be fit to the facial shape of a different user, thereby blocking external light from entering the eyes.

In addition to the above, the electronic device 30 may be equipped with a user input unit operated to receive a control command, sound output unit, and controller. Descriptions of the aforementioned units are the same as give previously and will be omitted.

Also, a VR electronic device may be equipped with a controller 40 (40a, 40b) for controlling the operation related to VR images displayed through the box-type electronic device 30 as a peripheral device.

The controller 40 is provided in a way that the user may easily grip the controller 40 by using his or her both hands, and the outer surface of the controller 40 may have a touchpad (or trackpad) or buttons for receiving the user input.

The controller 40 may be used to control the screen output on the display unit 32b in conjunction with the electronic device 30. The controller 40 may include a grip unit that the user grips and a head unit extended from the grip unit and equipped with various sensors and a microprocessor. The grip unit may be shaped as a long vertical bar so that the user may easily grip the grip unit, and the head unit may be formed in a ring shape.

And the controller 40 may include an IR sensor, motion tracking sensor, microprocessor, and input unit. For example, IR sensor receives light emitted from a position tracking device 50 to be described later and tracks motion of the user. The motion tracking sensor may be formed as a single sensor suite integrating a 3-axis acceleration sensor, 3-axis gyroscope, and digital motion processor.

And the grip unit of the controller 40 may provide a user input unit. For example, the user input unit may include keys disposed inside the grip unit, touchpad (trackpad) equipped outside the grip unit, and trigger button.

Meanwhile, the controller 40 may perform a feedback operation corresponding to a signal received from the controller 27 of the electronic device 30. For example, the controller 40 may deliver a feedback signal to the user in the form of vibration, sound, or light.

Also, by operating the controller 40, the user may access an external environment image seen through the camera installed in the electronic device 30. In other words, even in the middle of experiencing the virtual world, the user may immediately check the surrounding environment by operating the controller 40 without taking off the electronic device 30.

Also, the VR electronic device may further include a position tracking device 50. The position tracking device 50 detects the position of the electronic device 30 or controller 40 by applying a position tracking technique, called lighthouse system, and helps tracking the 360-degree motion of the user.

The position tacking system may be implemented by installing one or more position tracking device 50 (50a, 50b) in a closed, specific space. A plurality of position tracking devices 50 may be installed at such positions that maximize the span of location-aware space, for example, at positions facing each other in the diagonal direction.

The electronic device 30 or controller 40 may receive light emitted from LED or laser emitter included in the plurality of position tracking devices 50 and determine the accurate position of the user in a closed, specific space based on a correlation between the time and position at which the corresponding light is received. To this purpose, each of the position tracking devices 50 may include an IR lamp and 2-axis motor, through which a signal is exchanged with the electronic device 30 or controller 40.

Also, the electronic device 30 may perform wired/wireless communication with an external device 60 (for example, PC, smartphone, or tablet PC). The electronic device 30 may receive images of the virtual world stored in the connected external device 60 and display the received image to the user.

Meanwhile, since the controller 40 and position tracking device 50 described above are not essential elements, they may be omitted in the embodiments of the present disclosure. For example, an input device installed in the electronic device 30 may replace the controller 40, and position information may be determined by itself from various sensors installed in the electronic device 30.

Figure 5:
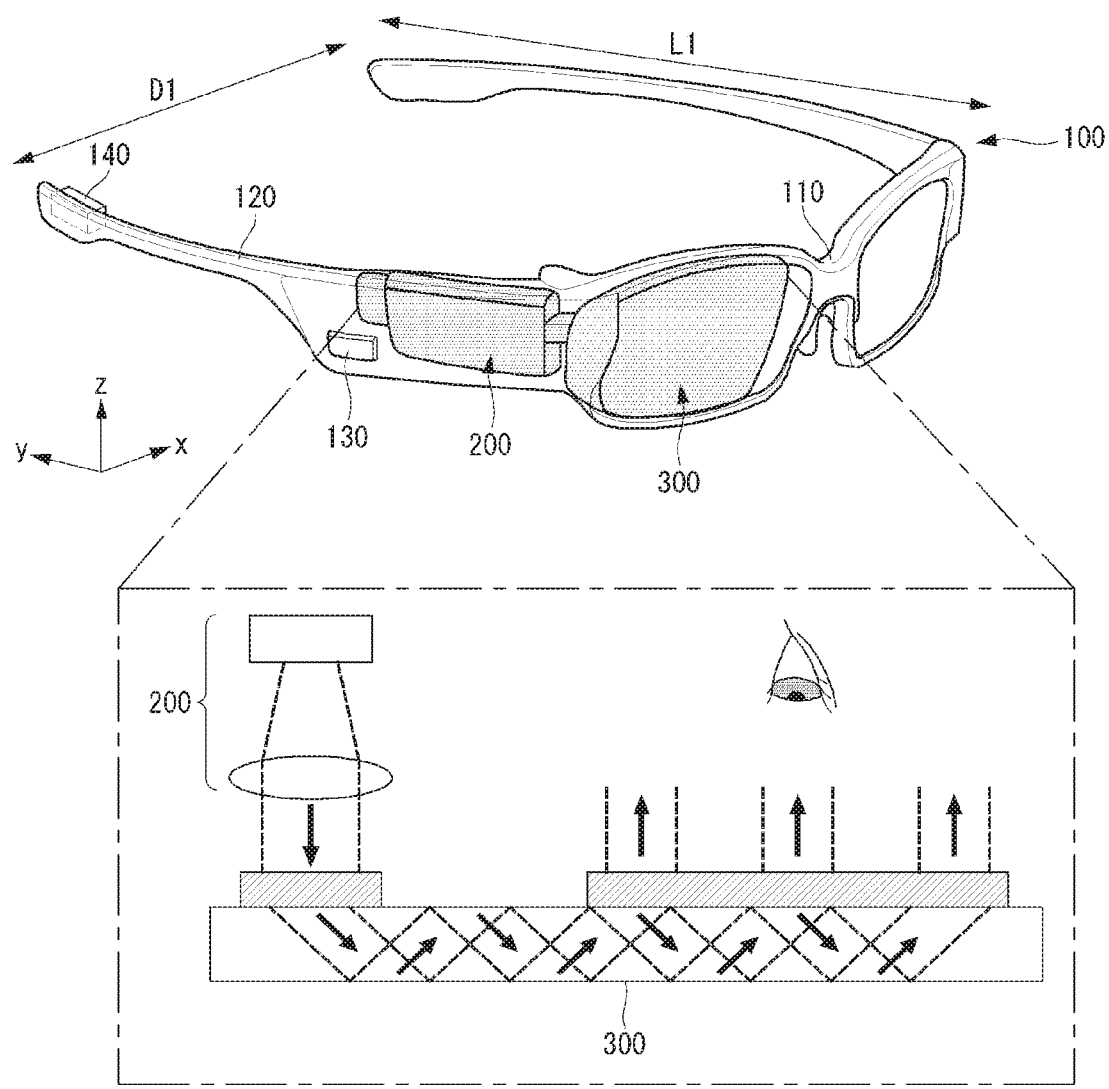
FIG. 5 is a perspective view of an AR electronic device according to one embodiment of the present disclosure.

FIG. 5 is a perspective view of an AR electronic device according to one embodiment of the present disclosure.

As shown in FIG. 5, the electronic device according to one embodiment of the present disclosure may include a frame 100, controller 200, and display unit 300.

The electronic device may be provided in the form of smart glasses. The glass-type electronic device may be shaped to be worn on the head of the user, for which the frame (case or housing) 100 may be used. The frame 100 may be made of a flexible material so that the user may wear the glass-type electronic device comfortably.

The frame 100 is supported on the head and provides a space in which various components are installed. As shown in the figure, electronic components such as the controller 200, user input unit 130, or sound output unit 140 may be installed in the frame 100. Also, lens that covers at least one of the left and right eyes may be installed in the frame 100 in a detachable manner.

As shown in the figure, the frame 100 may have a shape of glasses worn on the face of the user; however, the present disclosure is not limited to the specific shape and may have a shape such as goggles worn in close contact with the user's face.

The frame 100 may include a front frame 110 having at least one opening and one pair of side frames 120 parallel to each other and being extended in a first direction (y), which are intersected by the front frame 110.

The controller 200 is configured to control various electronic components installed in the electronic device.

The controller 200 may generate an image shown to the user or video comprising successive images. The controller 200 may include an image source panel that generates an image and a plurality of lenses that diffuse and converge light generated from the image source panel.

The controller 200 may be fixed to either of the two side frames 120. For example, the controller 200 may be fixed in the inner or outer surface of one side frame 120 or embedded inside one of side frames 120. Or the controller 200 may be fixed to the front frame 110 or provided separately from the electronic device.

The display unit 300 may be implemented in the form of a Head Mounted Display (HMD). HMD refers to a particular type of display device worn on the head and showing an image directly in front of eyes of the user. The display unit 300 may be disposed to correspond to at least one of left and right eyes so that images may be shown directly in front of the eye(s) of the user when the user wears the electronic device. The present figure illustrates a case where the display unit 300 is disposed at the position corresponding to the right eye of the user so that images may be shown before the right eye of the user.

The display unit 300 may be used so that an image generated by the controller 200 is shown to the user while the user visually recognizes the external environment. For example, the display unit 300 may project an image on the display area by using a prism.

And the display unit 300 may be formed to be transparent so that a projected image and a normal view (the visible part of the world as seen through the eyes of the user) in the front are shown at the same time. For example, the display unit 300 may be translucent and made of optical elements including glass.

And the display unit 300 may be fixed by being inserted into the opening included in the front frame 110 or may be fixed on the front surface 110 by being positioned on the rear surface of the opening (namely between the opening and the user's eye). Although the figure illustrates one example where the display unit 300 is fixed on the front surface 110 by being positioned on the rear surface of the rear surface, the display unit 300 may be disposed and fixed at various positions of the frame 100.

As shown in FIG. 5, the electronic device may operate so that if the controller 200 projects light about an image onto one side of the display unit 300, the light is emitted to the other side of the display unit, and the image generated by the controller 200 is shown to the user.

Accordingly, the user may see the image generated by the controller 200 while seeing the external environment simultaneously through the opening of the frame 100. In other words, the image output through the display unit 300 may be seen by being overlapped with a normal view. By using the display characteristic described above, the electronic device may provide an AR experience which shows a virtual image overlapped with a real image or background as a single, interwoven image.

Figure 6:
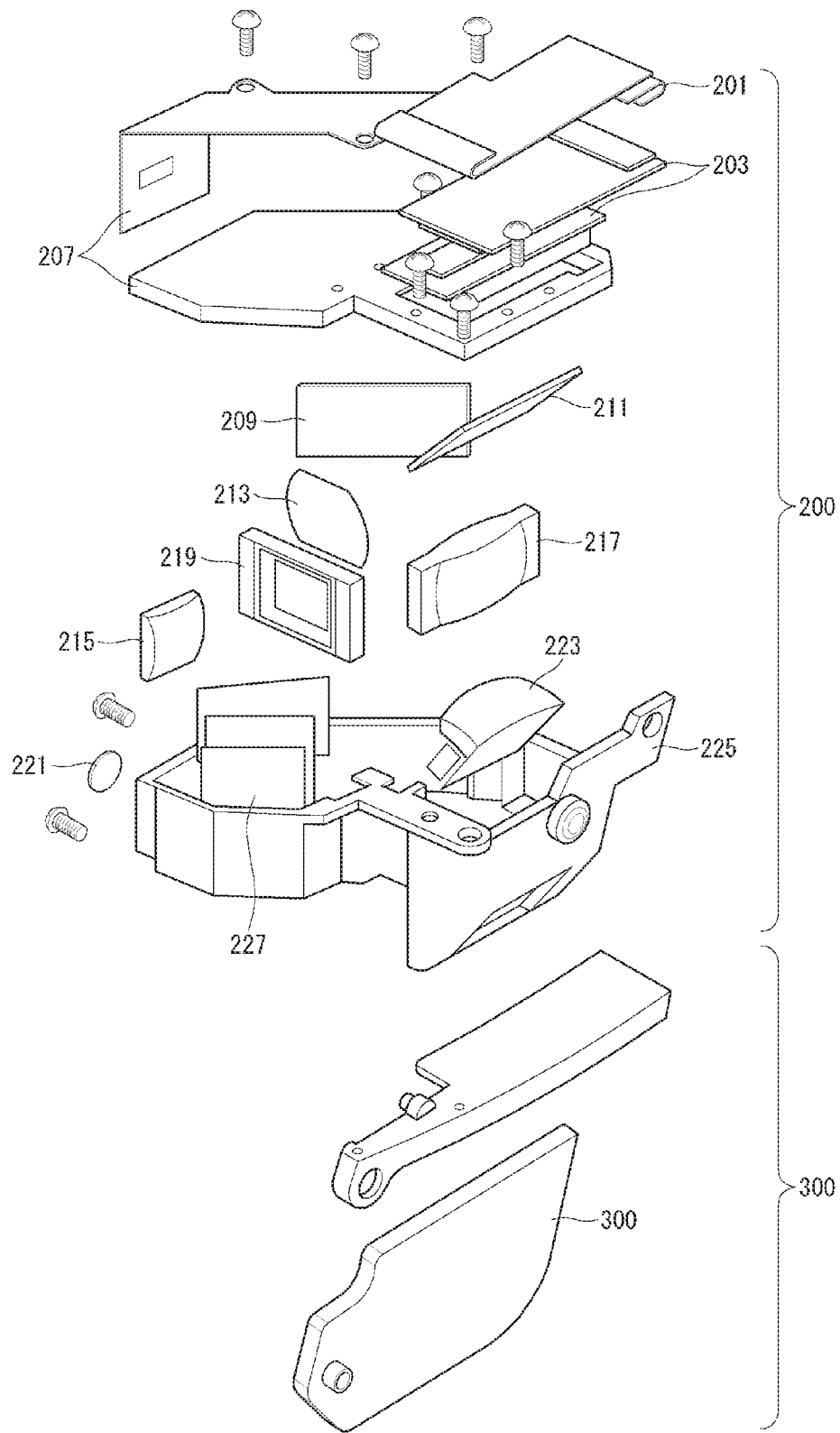
FIG. 6 is an exploded perspective view of a controller according to one embodiment of the present disclosure.

FIG. 6 is an exploded perspective view of a controller according to one embodiment of the present disclosure.

Referring to the figure, the controller 200 may include a first cover 207 and second cover 225 for protecting internal constituting elements and forming the external appearance of the controller 200, where, inside the first 207 and second 225 covers, included are a driving unit 201, image source panel 203, Polarization Beam Splitter Filter (PBSF) 211, mirror 209, a plurality of lenses 213, 215, 217, 221, Fly Eye Lens (FEL) 219, Dichroic filter 227, and Freeform prism Projection Lens (FPL) 223.

The first 207 and second 225 covers provide a space in which the driving unit 201, image source panel 203, PBSF 211, mirror 209, a plurality of lenses 213, 215, 217, 221, FEL 219, and FPL may be installed, and the internal constituting elements are packaged and fixed to either of the side frames 120.

The driving unit 201 may supply a driving signal that controls a video or an image displayed on the image source panel 203 and may be linked to a separate modular driving chip installed inside or outside the controller 200. The driving unit 201 may be installed in the form of Flexible Printed Circuits Board (FPCB), which may be equipped with heatsink that dissipates heat generated during operation to the outside.

The image source panel 203 may generate an image according to a driving signal provided by the driving unit 201 and emit light according to the generated image. To this purpose, the image source panel 203 may use the Liquid Crystal Display (LCD) or Organic Light Emitting Diode (OLED) panel.

The PBSF 211 may separate light due to the image generated from the image source panel 203 or block or pass part of the light according to a rotation angle. Therefore, for example, if the image light emitted from the image source panel 203 is composed of P wave, which is horizontal light, and S wave, which is vertical light, the PBSF 211 may separate the P and S waves into different light paths or pass the image light of one polarization or block the image light of the other polarization. The PBSF 211 may be provided as a cube type or plate type in one embodiment.

The cube-type PBSF 211 may filter the image light composed of P and S waves and separate them into different light paths while the plate-type PBSF 211 may pass the image light of one of the P and S waves but block the image light of the other polarization.

The mirror 209 reflects the image light separated from polarization by the PBSF 211 to collect the polarized image light again and let the collected image light incident on a plurality of lenses 213, 215, 217, 221.

The plurality of lenses 213, 215, 217, 221 may include convex and concave lenses and for example, may include I-type lenses and C-type lenses. The plurality of lenses 213, 215, 217, 221 repeat diffusion and convergence of image light incident on the lenses, thereby improving straightness of the image light rays.

The FEL 219 may receive the image light which has passed the plurality of lenses 213, 215, 217, 221 and emit the image light so as to improve illuminance uniformity and extend the area exhibiting uniform illuminance due to the image light.

The dichroic filter 227 may include a plurality of films or lenses and pass light of a specific range of wavelengths from the image light incoming from the FEL 219 but reflect light not belonging to the specific range of wavelengths, thereby adjusting saturation of color of the image light. The image light which has passed the dichroic filter 227 may pass through the FPL 223 and be emitted to the display unit 300.

The display unit 300 may receive the image light emitted from the controller 200 and emit the incident image light to the direction in which the user's eyes are located.

Meanwhile, in addition to the constituting elements described above, the electronic device may include one or more image capture means (not shown). The image capture means, being disposed close to at least one of left and right eyes, may capture the image of the front area. Or the image capture means may be disposed so as to capture the image of the side/rear area.

Since the image capture means is disposed close to the eye, the image capture means may obtain the image of a real world seen by the user. The image capture means may be installed at the frame 100 or arranged in plural numbers to obtain stereoscopic images.

The electronic device may provide a user input unit 130 manipulated to receive control commands. The user input unit 130 may adopt various methods including a tactile manner in which the user operates the user input unit by sensing a tactile stimulus from a touch or push motion, gesture manner in which the user input unit recognizes the hand motion of the user without a direct touch thereon, or a manner in which the user input unit recognizes a voice command. The present figure illustrates a case where the user input unit 130 is installed at the frame 100.

Also, the electronic device may be equipped with a microphone which receives a sound and converts the received sound to electrical voice data and a sound output unit 140 that outputs a sound. The sound output unit 140 may be configured to transfer a sound through an ordinary sound output scheme or bone conduction scheme. When the sound output unit 140 is configured to operate according to the bone conduction scheme, the sound output unit 140 is fit to the head when the user wears the electronic device and transmits sound by vibrating the skull.

In what follows, various forms of the display unit 300 and various methods for emitting incident image light rays will be described.

FIGS. 7 to 13 illustrate various display methods applicable to the display unit 300 according to one embodiment of the present disclosure.

Figure 7:
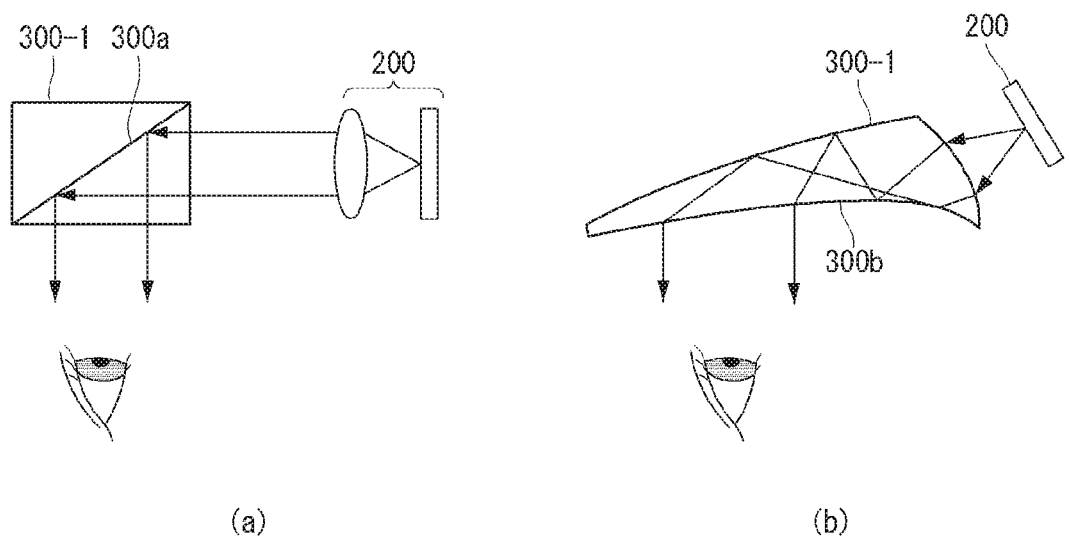
FIGS. 7 to 13 illustrate various display methods applicable to a display unit according to one embodiment of the present disclosure.
Figure 8:
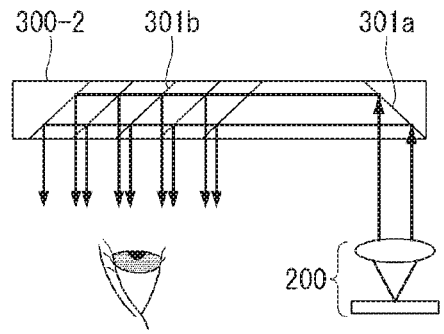
Figure 8:
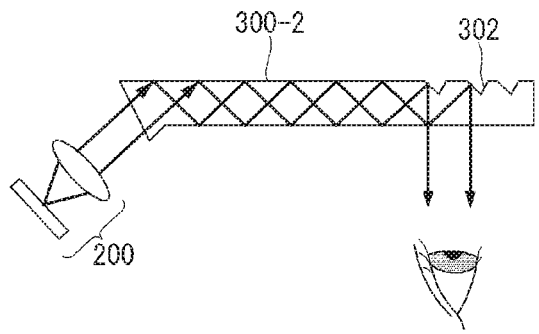
Figure 8:
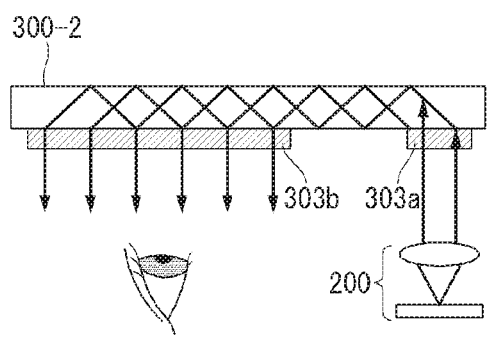
Figure 8:
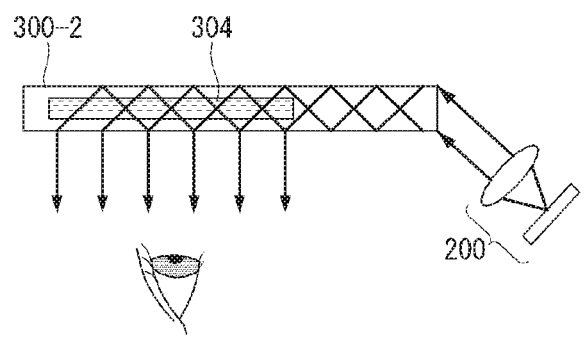
Figure 8:
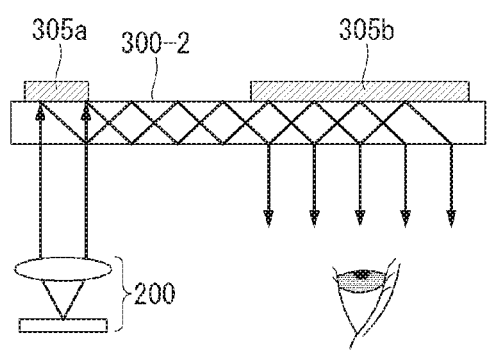
Figure 8:
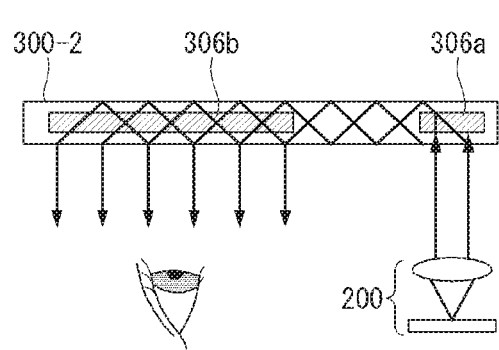
Figure 9:
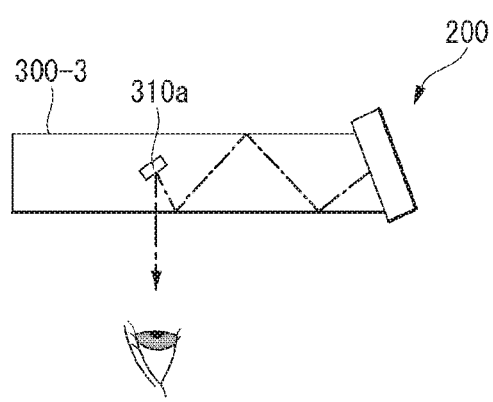
Figure 9:
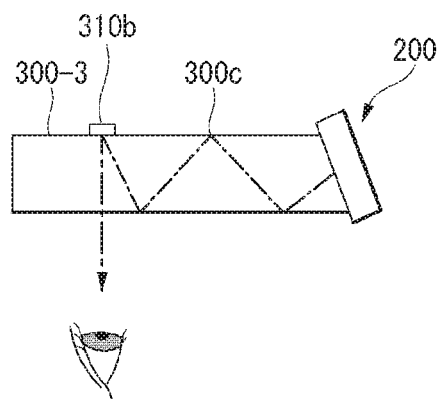
Figure 9:
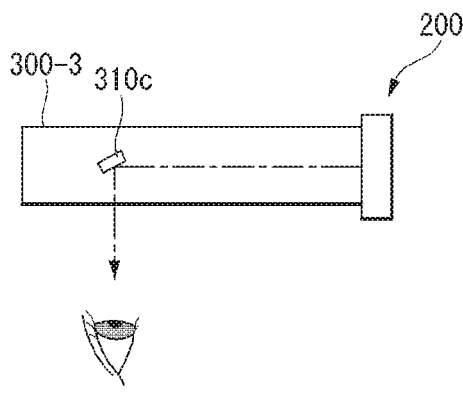
Figure 9:
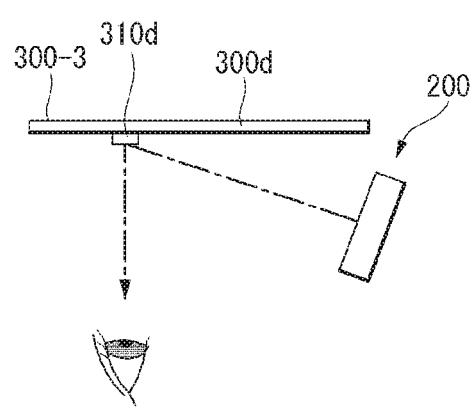
Figure 10:
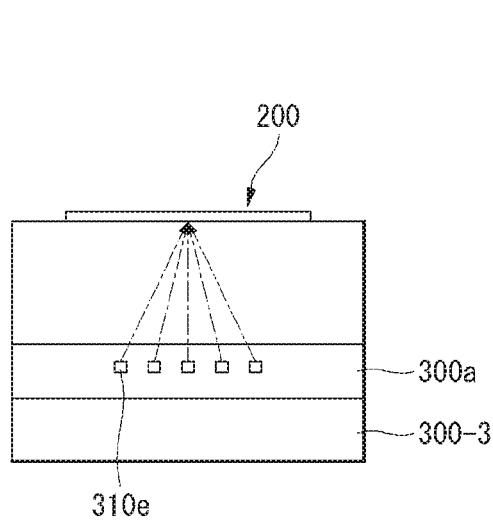
Figure 10:
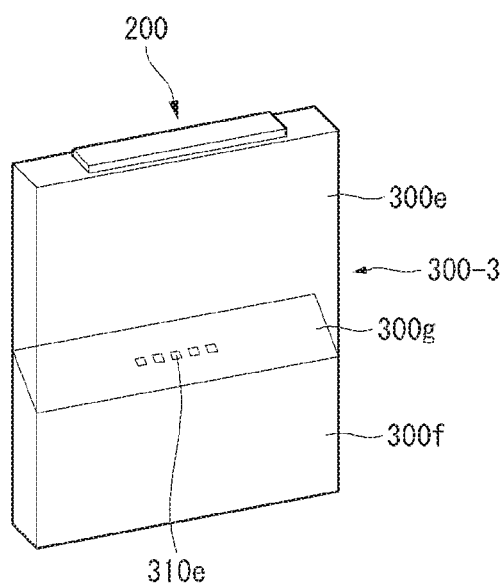
Figure 10:
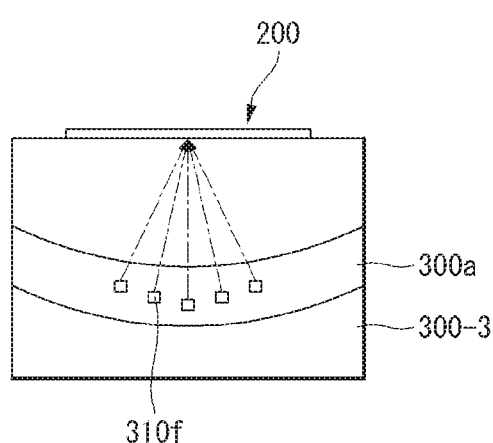
Figure 10:
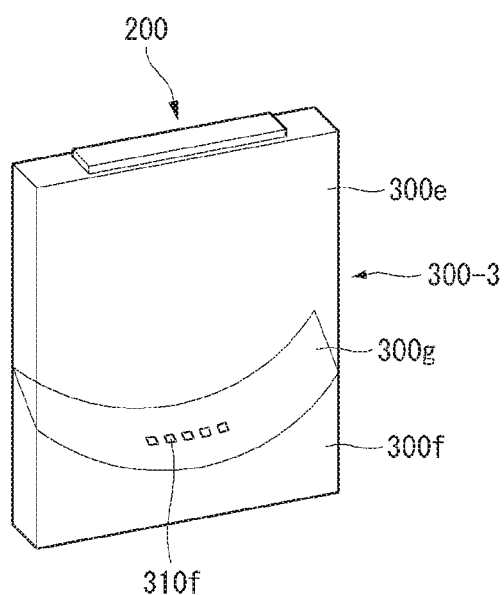
Figure 11:
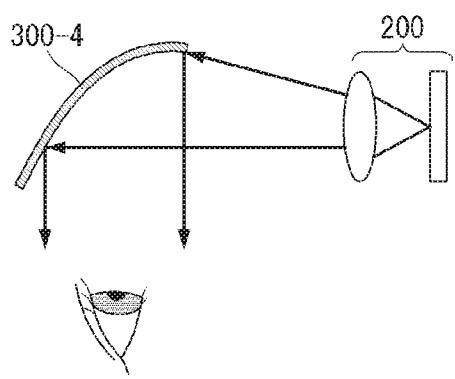
Figure 11:
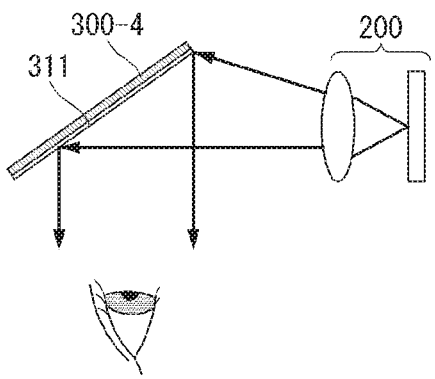
Figure 11:
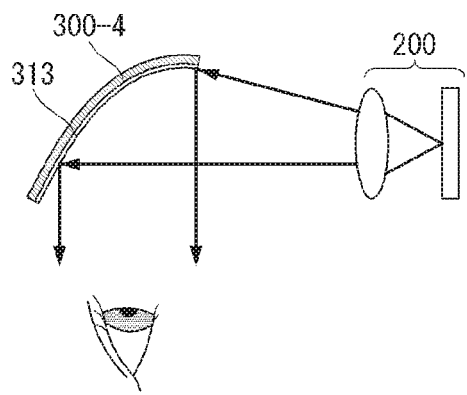
Figure 12:
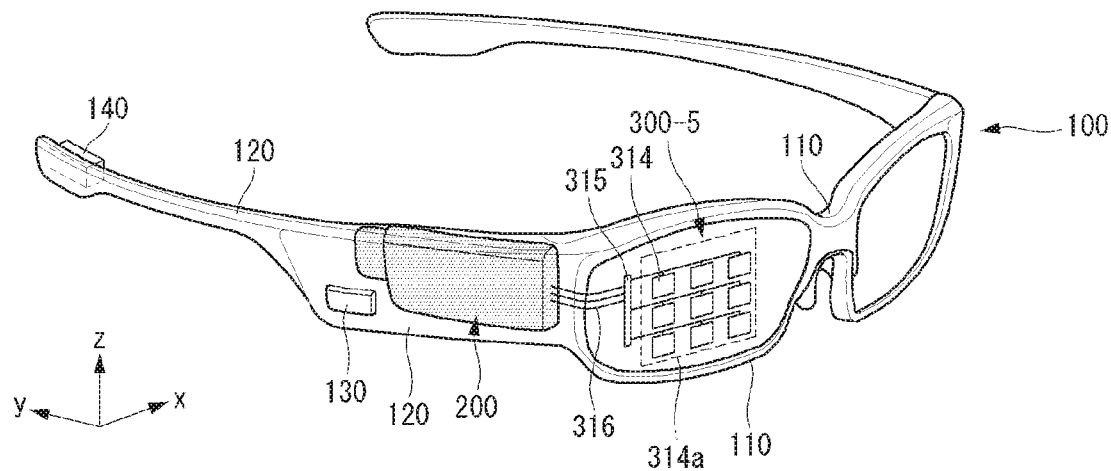
Figure 13:
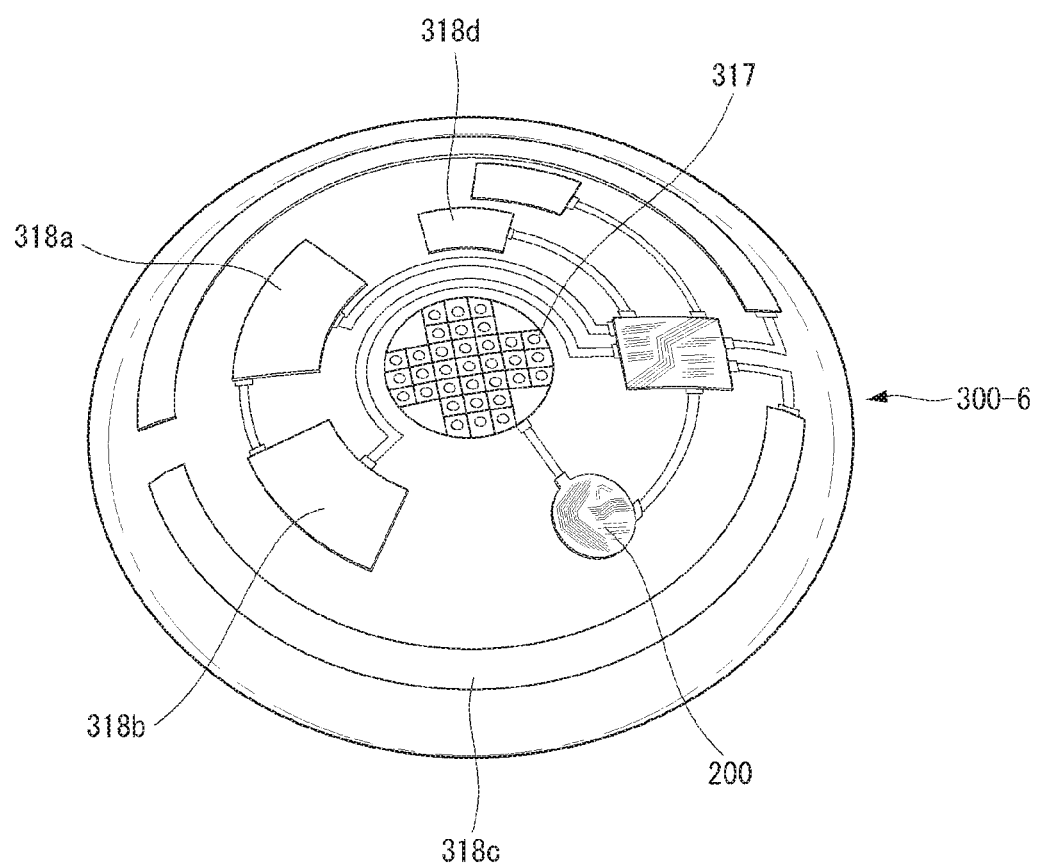

More specifically, FIG. 7 illustrates one embodiment of a prism-type optical element; FIG. 8 illustrates one embodiment of a waveguide-type optical element; FIGS. 9 and 10 illustrate one embodiment of a pin mirror-type optical element; and FIG. 11 illustrates one embodiment of a surface reflection-type optical element. And FIG. 12 illustrates one embodiment of a micro-LED type optical element, and FIG. 13 illustrates one embodiment of a display unit used for contact lenses.

As shown in FIG. 7, the display unit 300-1 according to one embodiment of the present disclosure may use a prism-type optical element.

In one embodiment, as shown in FIG. 7(a), a prism-type optical element may use a flat-type glass optical element where the surface 300a on which image light rays are incident and from which the image light rays are emitted is planar or as shown in FIG. 7(b), may use a freeform glass optical element where the surface 300b from which the image light rays are emitted is formed by a curved surface without a fixed radius of curvature.

The flat-type glass optical element may receive the image light generated by the controller 200 through the flat side surface, reflect the received image light by using the total reflection mirror 300a installed inside and emit the reflected image light toward the user. Here, laser is used to form the total reflection mirror 300a installed inside the flat type glass optical element.

The freeform glass optical element is formed so that its thickness becomes thinner as it moves away from the surface on which light is incident, receives image light generated by the controller 200 through a side surface having a finite radius of curvature, totally reflects the received image light, and emits the reflected light toward the user.

As shown in FIG. 8, the display unit 300-2 according to another embodiment of the present disclosure may use a waveguide-type optical element or light guide optical element (LOE).

As one embodiment, the waveguide or light guide-type optical element may be implemented by using a segmented beam splitter-type glass optical element as shown in FIG. 8(a), saw tooth prism-type glass optical element as shown in FIG. 8(b), glass optical element having a diffractive optical element (DOE) as shown in FIG. 8(c), glass optical element having a hologram optical element (HOE) as shown in FIG. 8(d), glass optical element having a passive grating as shown in FIG. 8(e), and glass optical element having an active grating as shown in FIG. 8(f).

As shown in FIG. 8(a), the segmented beam splitter-type glass optical element may have a total reflection mirror 301a where an optical image is incident and a segmented beam splitter 301b where an optical image is emitted.

Accordingly, the optical image generated by the controller 200 is totally reflected by the total reflection mirror 301a inside the glass optical element, and the totally reflected optical image is partially separated and emitted by the partial reflection mirror 301b and eventually perceived by the user while being guided along the longitudinal direction of the glass.

In the case of the saw tooth prism-type glass optical element as shown in FIG. 8(b), the optical image generated by the controller 200 is incident on the side surface of the glass in the oblique direction and totally reflected into the inside of the glass, emitted to the outside of the glass by the saw tooth-shaped uneven structure 302 formed where the optical image is emitted, and eventually perceived by the user.

The glass optical element having a Diffractive Optical Element (DOE) as shown in FIG. 8(c) may have a first diffraction unit 303a on the surface of the part on which the optical image is incident and a second diffraction unit 303b on the surface of the part from which the optical image is emitted. The first and second diffraction units 303a, 303b may be provided in a way that a specific pattern is patterned on the surface of the glass or a separate diffraction film is attached thereon.

Accordingly, the optical image generated by the controller 200 is diffracted as it is incident through the first diffraction unit 303a, guided along the longitudinal direction of the glass while being totally reflected, emitted through the second diffraction unit 303b, and eventually perceived by the user.

The glass optical element having a Hologram Optical Element (HOE) as shown in FIG. 8(d) may have an out-coupler 304 inside the glass from which an optical image is emitted. Accordingly, the optical image is incoming from the controller 200 in the oblique direction through the side surface of the glass, guided along the longitudinal direction of the glass by being totally reflected, emitted by the out-coupler 304, and eventually perceived by the user. The structure of the HOE may be modified gradually to be further divided into the structure having a passive grating and the structure having an active grating.

The glass optical element having a passive grating as shown in FIG. 8(e) may have an in-coupler 305a on the opposite surface of the glass surface on which the optical image is incident and an out-coupler 305b on the opposite surface of the glass surface from which the optical image is emitted. Here, the in-coupler 305a and the out-coupler 305b may be provided in the form of film having a passive grating.

Accordingly, the optical image incident on the glass surface at the light-incident side of the glass is totally reflected by the in-coupler 305a installed on the opposite surface, guided along the longitudinal direction of the glass, emitted through the opposite surface of the glass by the out-coupler 305b, and eventually perceived by the user.

The glass optical element having an active grating as shown in FIG. 8(f) may have an in-coupler 306a formed as an active grating inside the glass through which an optical image is incoming and an out-coupler 306b formed as an active grating inside the glass from which the optical image is emitted.

Accordingly, the optical image incident on the glass is totally reflected by the in-coupler 306a, guided in the longitudinal direction of the glass, emitted to the outside of the glass by the out-coupler 306b, and eventually perceived by the user.

The display unit 300-3 according to another embodiment of the present disclosure may use a pin mirror-type optical element.

The pinhole effect is so called because the hole through which an object is seen is like the one made with the point of a pin and refers to the effect of making an object look more clearly as light is passed through a small hole. This effect results from the nature of light due to refraction of light, and the light passing through the pinhole deepens the depth of field (DOF), which makes the image formed on the retina more vivid.

In what follows, an embodiment for using a pin mirror-type optical element will be described with reference to FIGS. 9 and 10.

Referring to FIG. 9(a), the pinhole mirror 310a may be provided on the path of incident light within the display unit 300-3 and reflect the incident light toward the user's eye. More specifically, the pinhole mirror 310a may be disposed between the front surface (outer surface) and the rear surface (inner surface) of the display unit 300-3, and a method for manufacturing the pinhole mirror will be described again later.

The pinhole mirror 310a may be formed to be smaller than the pupil of the eye and to provide a deep depth of field. Therefore, even if the focal length for viewing a real world through the display unit 300-3 is changed, the user may still clearly see the real world by overlapping an augmented reality image provided by the controller 200 with the image of the real world.

And the display unit 300-3 may provide a path which guides the incident light to the pinhole mirror 310a through internal total reflection.

Referring to FIG. 9(b), the pinhole mirror 310b may be provided on the surface 300c through which light is totally reflected in the display unit 300-3. Here, the pinhole mirror 310b may have the characteristic of a prism that changes the path of external light according to the user's eyes. For example, the pinhole mirror 310b may be fabricated as film-type and attached to the display unit 300-3, in which case the process for manufacturing the pinhole mirror is made easy.

The display unit 300-3 may guide the incident light incoming from the controller 200 through internal total reflection, the light incident by total reflection may be reflected by the pinhole mirror 310b installed on the surface on which external light is incident, and the reflected light may pass through the display unit 300-3 to reach the user's eyes.

Referring to FIG. 9(c), the incident light illuminated by the controller 200 may be reflected by the pinhole mirror 310c directly without internal total reflection within the display unit 300-3 and reach the user's eyes. This structure is convenient for the manufacturing process in that augmented reality may be provided irrespective of the shape of the surface through which external light passes within the display unit 300-3.

Referring to FIG. 9(d), the light illuminated by the controller 200 may reach the user's eyes by being reflected within the display unit 300-3 by the pinhole mirror 310d installed on the surface 300d from which external light is emitted. The controller 200 is configured to illuminate light at the position separated from the surface of the display unit 300-3 in the direction of the rear surface and illuminate light toward the surface 300d from which external light is emitted within the display unit 300-3. The present embodiment may be applied easily when thickness of the display unit 300-3 is not sufficient to accommodate the light illuminated by the controller 200. Also, the present embodiment may be advantageous for manufacturing in that it may be applied irrespective of the surface shape of the display unit 300-3, and the pinhole mirror 310d may be manufactured in a film shape.

Meanwhile, the pinhole mirror 310 may be provided in plural numbers in an array pattern.

FIG. 10 illustrates the shape of a pinhole mirror and structure of an array pattern according to one embodiment of the present disclosure.

Referring to the figure, the pinhole mirror 310 may be fabricated in a polygonal structure including a square or rectangular shape. Here, the length (diagonal length) of a longer axis of the pinhole mirror 310 may have a positive square root of the product of the focal length and wavelength of light illuminated in the display unit 300-3.

A plurality of pinhole mirrors 310 are disposed in parallel, being separated from each other, to form an array pattern. The array pattern may form a line pattern or lattice pattern.

FIGS. 10(a) and (b) illustrate the Flat Pin Mirror scheme, and FIGS. 10(c) and (d) illustrate the freeform Pin Mirror scheme.

When the pinhole mirror 310 is installed inside the display unit 300-3, the first glass 300e and the second glass 300f are combined by an inclined surface 300g disposed being inclined toward the pupil of the eye, and a plurality of pinhole mirrors 310e are disposed on the inclined surface 300g by forming an array pattern.

Referring to FIGS. 10(a) and (b), a plurality of pinhole mirrors 310e may be disposed side by side along one direction on the inclined surface 300g and continuously display the augmented reality provided by the controller 200 on the image of a real world seen through the display unit 300-3 even if the user moves the pupil of the eye.

And referring to FIGS. 10(c) and (d), the plurality of pinhole mirrors 310f may form a radial array on the inclined surface 300g provided as a curved surface.

Since the plurality of pinhole mirrors 300f are disposed along the radial array, the pinhole mirror 310f at the edge in the figure is disposed at the highest position, and the pinhole mirror 310f in the middle thereof is disposed at the lowest position, the path of a beam emitted by the controller 200 may be matched to each pinhole mirror.

As described above, by disposing a plurality of pinhole arrays 310f along the radial array, the double image problem of augmented reality provided by the controller 200 due to the path difference of light may be resolved.

Similarly, lenses may be attached on the rear surface of the display unit 300-3 to compensate for the path difference of the light reflected from the plurality of pinhole mirrors 310e disposed side by side in a row.

The surface reflection-type optical element that may be applied to the display unit 300-4 according to another embodiment of the present disclosure may employ the freeform combiner method as shown in FIG. 11(a), Flat HOE method as shown in FIG. 11(b), and freeform HOE method as shown in FIG. 11(c).

The surface reflection-type optical element based on the freeform combiner method as shown in FIG. 11(a) may use freeform combiner glass 300, for which a plurality of flat surfaces having different incidence angles for an optical image are combined to form one glass with a curved surface as a whole to perform the role of a combiner. The freeform combiner glass 300 emits an optical image to the user by making incidence angle of the optical image differ in the respective areas.

The surface reflection-type optical element based on Flat HOE method as shown in FIG. 11(b) may have a hologram optical element (HOE) 311 coated or patterned on the surface of flat glass, where an optical image emitted by the controller 200 passes through the HOE 311, reflects from the surface of the glass, again passes through the HOE 311, and is eventually emitted to the user.

The surface reflection-type optical element based on the freeform HOE method as shown in FIG. 11(c) may have a HOE 313 coated or patterned on the surface of freeform glass, where the operating principles may be the same as described with reference to FIG. 11(b).

In addition, a display unit 300-5 employing micro LED as shown in FIG. 12 and a display unit 300-6 employing a contact lens as shown in FIG. 13 may also be used.

Referring to FIG. 12, the optical element of the display unit 300-5 may include a Liquid Crystal on Silicon (LCoS) element, Liquid Crystal Display (LCD) element, Organic Light Emitting Diode (OLED) display element, and Digital Micromirror Device (DMD); and the optical element may further include a next-generation display element such as Micro LED and Quantum Dot (QD) LED.

The image data generated by the controller 200 to correspond to the augmented reality image is transmitted to the display unit 300-5 along a conductive input line 316, and the display unit 300-5 may convert the image signal to light through a plurality of optical elements 314 (for example, microLED) and emits the converted light to the user's eye.

The plurality of optical elements 314 are disposed in a lattice structure (for example, 100×100) to form a display area 314a. The user may see the augmented reality through the display area 314a within the display unit 300-5. And the plurality of optical elements 314 may be disposed on a transparent substrate.

The image signal generated by the controller 200 is sent to an image split circuit 315 provided at one side of the display unit 300-5; the image split circuit 315 is divided into a plurality of branches, where the image signal is further sent to an optical element 314 disposed at each branch. At this time, the image split circuit 315 may be located outside the field of view of the user so as to minimize gaze interference.

Referring to FIG. 13, the display unit 300-5 may comprise a contact lens. A contact lens 300-5 on which augmented reality may be displayed is also called a smart contact lens. The smart contact lens 300-5 may have a plurality of optical elements 317 in a lattice structure at the center of the smart contact lens.

The smart contact lens 300-5 may include a solar cell 318a, battery 318b, controller 200, antenna 318c, and sensor 318d in addition to the optical element 317. For example, the sensor 318d may check the blood sugar level in the tear, and the controller 200 may process the signal of the sensor 318d and display the blood sugar level in the form of augmented reality through the optical element 317 so that the user may check the blood sugar level in real-time.

As described above, the display unit 300 according to one embodiment of the present disclosure may be implemented by using one of the prism-type optical element, waveguide-type optical element, light guide optical element (LOE), pin mirror-type optical element, or surface reflection-type optical element. In addition to the above, an optical element that may be applied to the display unit 300 according to one embodiment of the present disclosure may include a retina scan method.

Figure 14:
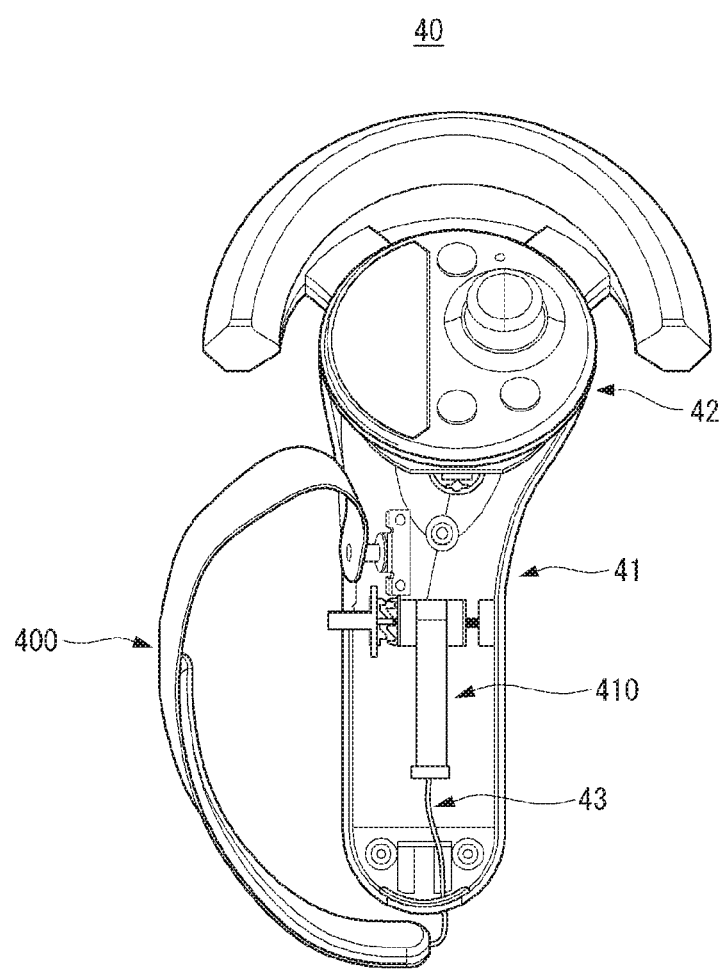
FIG. 14 is a perspective view illustrating a controller implementing an electronic device according to an embodiment of the present disclosure.

Hereinafter, according to the present disclosure, an electronic device may be implemented as a controller available to the user wearing an HMD as shown in FIGS. 3, 4, and 14. Referring to FIGS. 3 and 4, VR electronic device encompasses a head mounted display (HMD)-type electronic device 30 worn on the user's head and controller-type electronic device 40, 40a, or 40b which is manipulated by the HMD-wearing user in her hand.

According to an embodiment, the controller 40, as an implementation of the electronic device of the present disclosure, may be embodied as shown in FIG. 14. FIG. 14 is a perspective view illustrating a controller implementing an electronic device according to an embodiment of the present disclosure. Hereinafter, electronic device denotes the controller 40 shown in FIG. 14, and the terms "electronic device" and "controller 40" may be interchangeably used.

According to an embodiment of the present disclosure, the controller 40 may control operations and interactions related to content or VR images or videos displayed on the HMD 30 used for AR and/or VR.

Referring to FIG. 14, according to an embodiment of the present disclosure, the controller 40 includes a handle 41 which may easily be gripped in the user's hand, a strap portion 400 wrapped around the user's hand, and a strap tension adjuster 410 provided inside the controller 40. For example, a touchpad (or trackpad) or buttons for receiving the user's input are provided on an upper portion 42 of the handle of the controller 40.

As described above, the handle 41 of the controller 40 may be referred to as a grip, and the upper portion 42 of the handle may be referred to as a head 42.

Various sensors and a microprocessor extending from the handle 41 may be embedded in the head 42. As shown in FIGS. 14 to 21, the handle 41 may be shaped as an elongated bar to allow the user to easily grip in her hand, and the head 42 may be shaped as a ring.

Two opposite ends of the strap portion 400 are connected to the handle 41, and one (hereinafter, a 'first end') of the ends is connected with the strap tension adjuster 410 while the other (hereinafter, a 'second end') is rotatably connected with the handle 41. The first end of the strap portion 400 is connected with the strap tension adjuster 410 via a connecting element 43, which is described below in detail.

Figure 15:
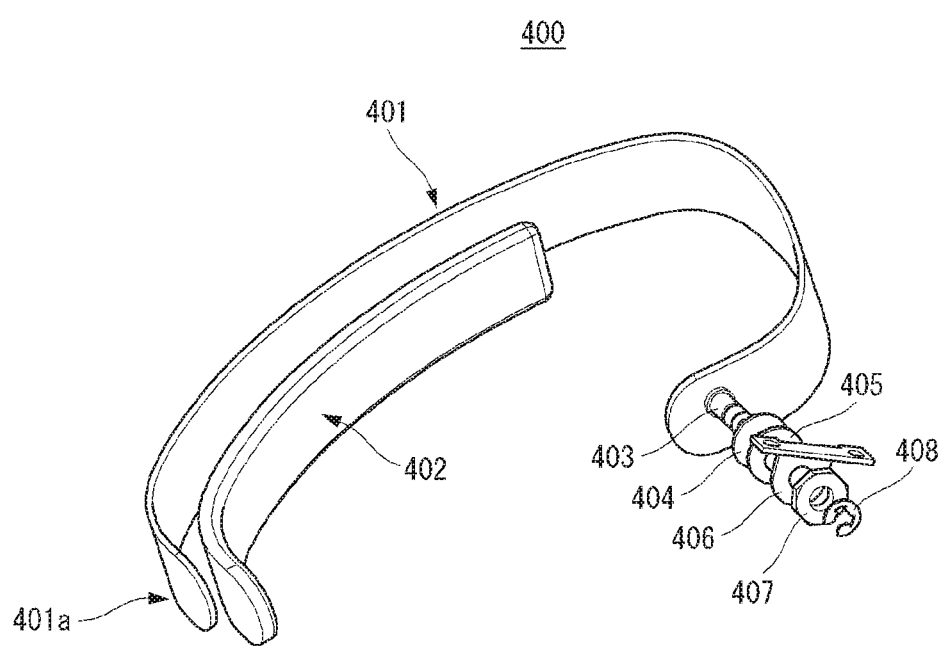
FIG. 15 is a perspective view illustrating a strap portion according to an embodiment of the present disclosure.

Referring to FIG. 15, the strap portion 400 includes a strap frame 401, a cushion 402, a hinge shaft 403, a washer 404, a spring washer 405, a washer plate 406, a nut 407, and an E-ring 408. The washer 404, the spring washer 405, the washer plate 406, the nut 407, and the E-ring 408 all may be fitted over the hinge shaft 403.

FIG. 15 is a perspective view illustrating a strap portion according to an embodiment of the present disclosure.

Referring to FIG. 15, the strap frame 401 is a part wrapped around the user's hand. According to the present disclosure, the strap frame 401 may be formed of a metal or plastic with a predetermined strength. The cushion 402 is mounted on the inner surface of the strap frame 401 which directly contacts the user's hand, mitigating damage due to friction between the user's hand and the strap frame 401. The cushion 402 may be formed of elastic rubber or a similar material. The hinge shaft 403 fastens the second end of the strap portion 400 to the handle 41 while allowing the strap portion 400 to rotate around the hinge shaft 403 from the handle 41. The hinge shaft 403 passes through the handle 41 and connects to the strap portion 400. By the washer 404 and the spring washer 405, the strap portion 400 is prevented from damage due to friction with the handle 41 although rotating around the hinge shaft 403.

The washer plate 406 is used to fasten the hinge shaft 403 to an inner wall of the handle 41, and the nut 407 is coupled to the hinge shaft 403 to prevent the hinge shaft 403 from escaping off the washer plate 406. The E-ring 408 prevents the nut 407 from loosening from the hinge shaft 403 as the hinge shaft 403 rotates.

The configuration in which the strap portion 400 rotates around the hinge shaft 403 is described below in greater detail.

Figure 16:
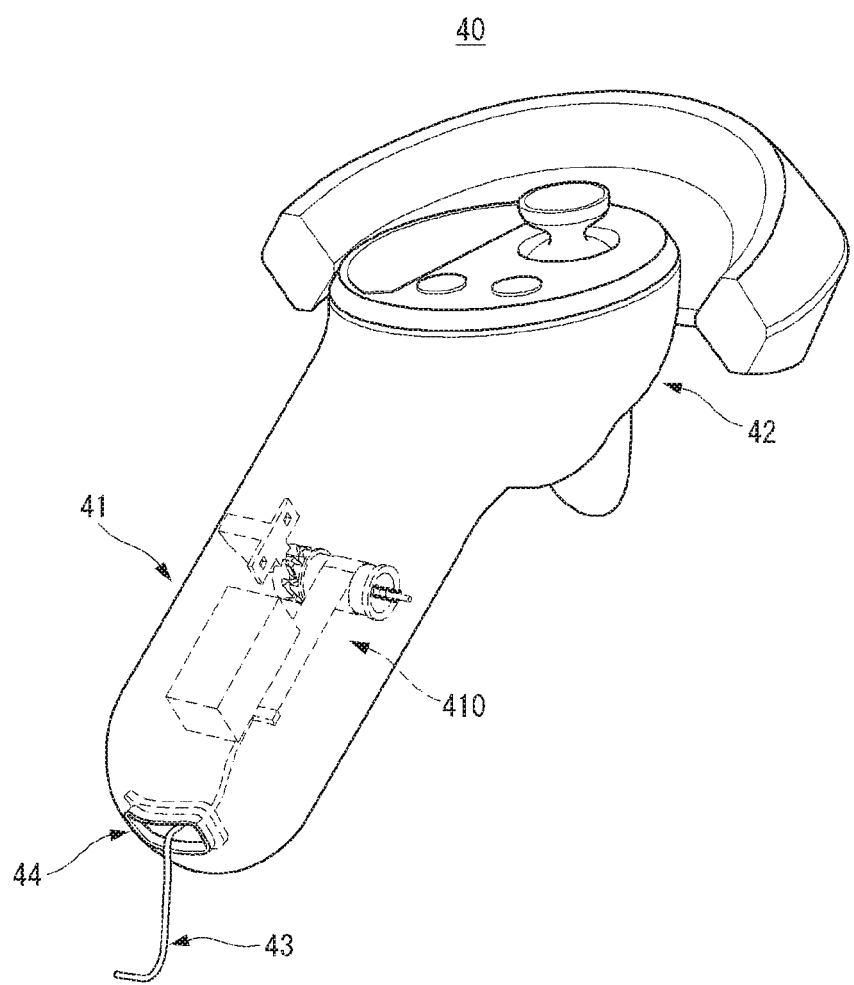
FIG. 16 is a view illustrating a strap tension adjuster positioned inside a controller according to an embodiment of the present disclosure.

Referring to FIG. 16, according to an embodiment, the strap tension adjuster is embedded inside the handle 41, with a link button 411 partially protruding to the outside of the handle 41. In other words, a button part 411a of the link button 411 projects to the outside of the handle 41. An opening 44 is formed in the bottom of the handle 41 to pass a connecting element 43 therethrough to connect the second end of the strap portion 400 with the strap tension adjuster 410 embedded inside the handle 41.

FIG. 16 is a view illustrating a strap tension adjuster 410 positioned inside a controller according to an embodiment of the present disclosure.

According to an embodiment of the present disclosure, the strap tension adjuster 410 is described below in greater detail with reference to FIGS. 17 and 18. According to an embodiment, the strap tension adjuster 410 includes a link button 411, a first gear 413, a first spring 415, a second gear 416, a second spring 419, and a pin 420.

Figure 17:
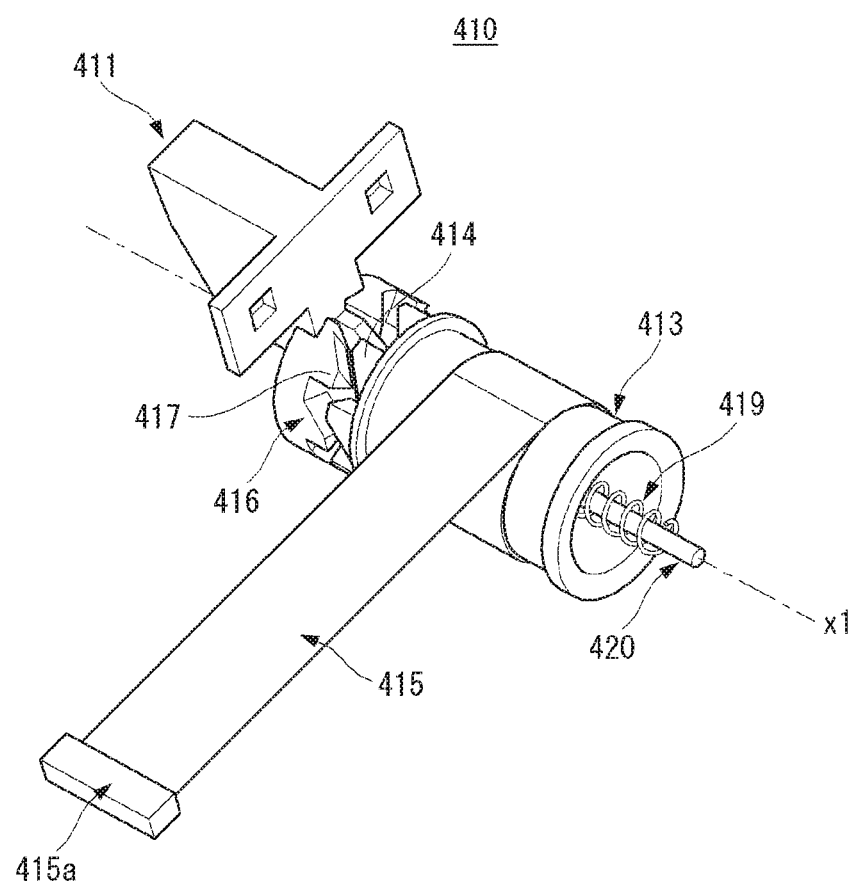
FIG. 17 is a perspective view illustrating a strap tension adjuster according to an embodiment of the present disclosure.

FIG. 17 is a perspective view illustrating the strap tension adjuster according to an embodiment of the present disclosure. FIG. 18 is an exploded perspective view illustrating the strap tension adjuster according to an embodiment of the present disclosure.

The link button 411 is configured to be pressed towards the inside of the handle 41 when the button part 411a of the link button 411 is pressed by the user in which case the first gear 413 is pushed away from the second gear 416 by a portion 412 of the link button 411. The link button 411 includes a first arm 412 that pushes the first gear 413 away from the second gear 416 as shown in FIGS. 17 and 18. The first arm 412 contacts and connects with the first gear 413.

Figure 18:
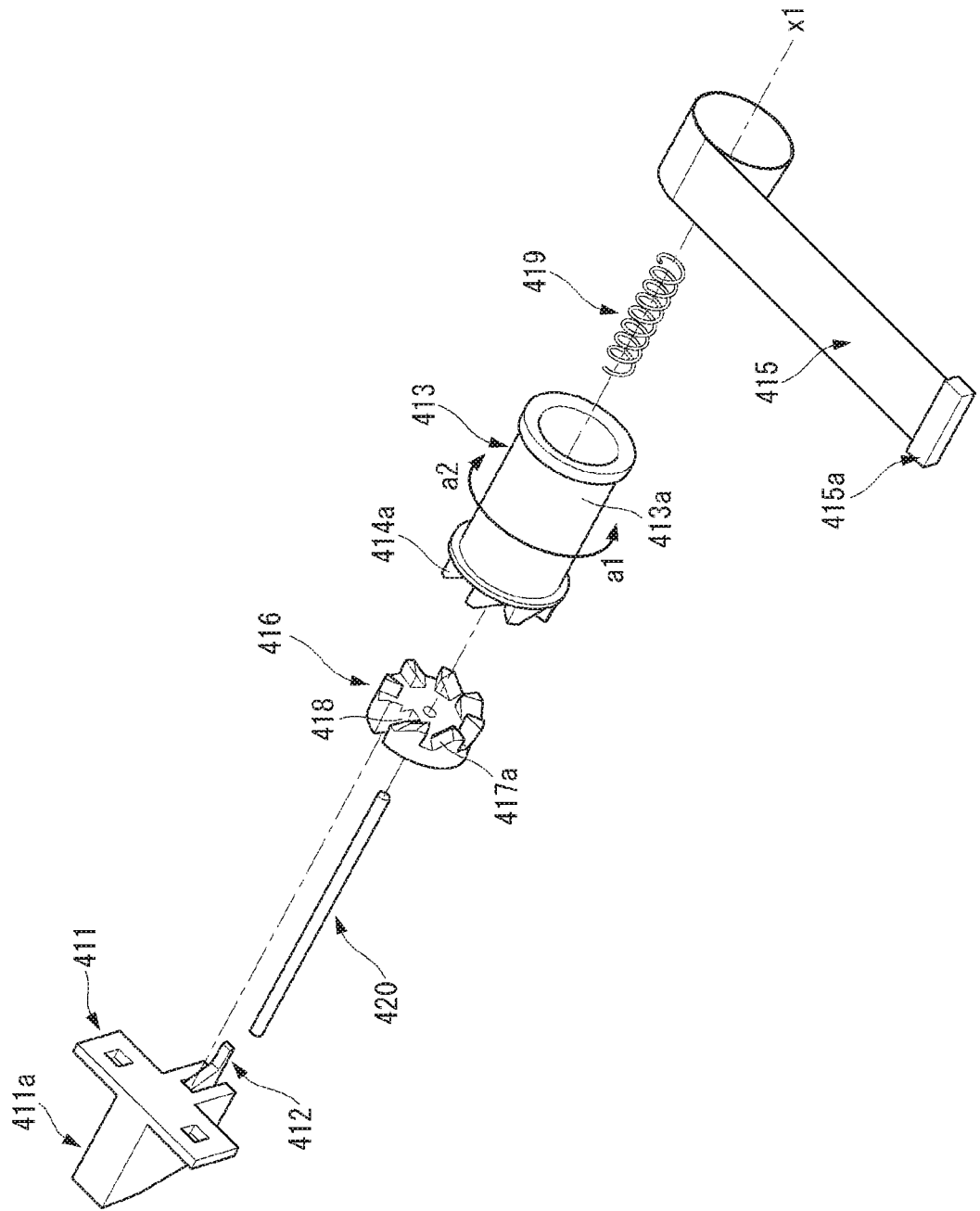
FIG. 18 is an exploded perspective view illustrating a strap tension adjuster according to an embodiment of the present disclosure.

The first gear 413 includes a body 413a around which the first spring 415 is wound and first sawteeth 414 and is configured to be spinnable in a first direction a1 of FIG. 18. Each of the first sawteeth 414 has a first slope surface 414a inclined in the first direction a1 and no slope surface formed in a second direction a2 opposite to the first direction a1.

The second gear 416 includes second sawteeth 417 and is configured to be stopped from spinning in the first and second directions a1 and a2. The second gear 416 may be configured to be unspinnably coupled with the link button 411. For example, the second gear 416 may be unspinnably fastened to the inner wall of the handle 41. In the case where the second gear 416 is configured to be unspinnably coupled with the link button 411, since the second gear 416 has a receiving groove 418 for receiving a portion 412 of the link button 411 and the portion 412 of the link button 411 remains engaged to the receiving groove 418, the second gear 416 is unable to spin in the first direction a1 or second direction a2.

As shown in FIGS. 17 and 18, where the portion 412 of the link button 411 is formed as, e.g., the first arm 412, the first arm 412 is formed to be longer than the receiving groove 418. To enable the first arm 412 to push away the first gear 413 when the button part 411a is pressed by the user, the receiving groove 418 is configured to have openings in both ends thereof, and the first arm 412 placed in the receiving groove 418 moves straight along an x1 axis.

Each of the second sawteeth 417 has a second slope surface 417a inclined in the second direction a2 and no slope surface formed in the first direction a1 opposite to the second direction a2.

Thus, the first sawteeth 414 and the second sawteeth 417 may be symmetrically arranged as shown in FIGS. 17 and 18 and, when the first gear 413 is positioned adjacent to the second gear 416, the first sawteeth 414 and the second sawteeth 417 may be engaged with each other. In other words, the first slope surface 414a and the second slope surface 417a are disposed to face, and come in frictional contact with, each other.

Thus, while being engaged with the second gear 416, the first gear 413 may be spun around the x1 axis only in the direction a1 by the first slope surfaces 414a of the first sawteeth 414 and the second slope surfaces 417a of the second sawteeth 417.

However, as the button part 411a is pressed by the user, the first arm 412 may be slid straight along the receiving groove 418, pushing away the first gear 413 to disengage from the second gear 416. As the first gear 413 and the second gear 416 are disengaged from each other, the first gear 413 is enabled to spin in the second direction a2.

The first spring 415 may be a spiral spring and be wound around the body 413a of the first gear 413. For example, the first spring 415 may be wound around the first gear 413, with its center coaxial with the rotation axis x1 of the first gear 413, and one end of the first spring 415 is fastened to the body 413a of the first gear 413. The opposite end (hereinafter, a second end 415a) of the first spring 415 is connected with the connecting element 43.

The first end of the strap portion 400 is indirectly connected with the opposite end 415a of the first spring 415 via the connecting element 43.

According to an embodiment, the strap tension adjuster 410 may further include a second spring 419 that allows the first gear 413, which has been pushed away from the second gear 416 by the user pressing the button part 411a, to be engaged back with the second gear 416 as the user releases the button part 411a.

For example, as shown in FIGS. 17 and 18, the second spring 419 elastically supports the first gear 413, inside the first gear 413, on the x1 axis towards the outside of the handle 41. The center of the second spring 419 is coaxial with the rotation axis of the first gear 413. The second spring 419 is contracted when the first gear 413 is pushed away by the first arm 412 and is elastically restored while pushing the first gear 413 towards the outside of the handle 41 when the button part 411a is released.

The first gear 413 and the second gear 416 are fastened by the pin 420 in predetermined positions inside the handle 41. The pin 420 penetrates the first gear 413 and the second gear 416 along the x1 axis which is the center axis and rotation axis of the first gear 413 and the second gear 416. One end, or two opposite ends, of the pin 420 are fastened to an inner wall fastening part 41a which is formed on an inner wall of the handle 41. In this case, the second spring 419 and the pin 420, in combination, may be placed inside the first gear 413.

Figure 20:
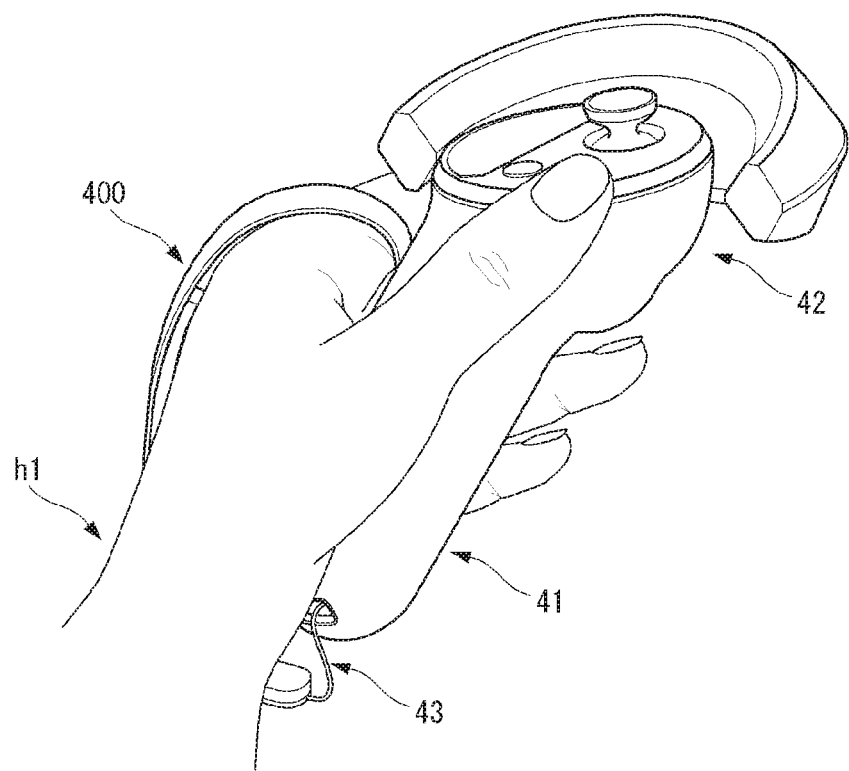
FIGS. 20 and 21 are views illustrating a state of using a controller according to an embodiment of the present disclosure.
Figure 21:
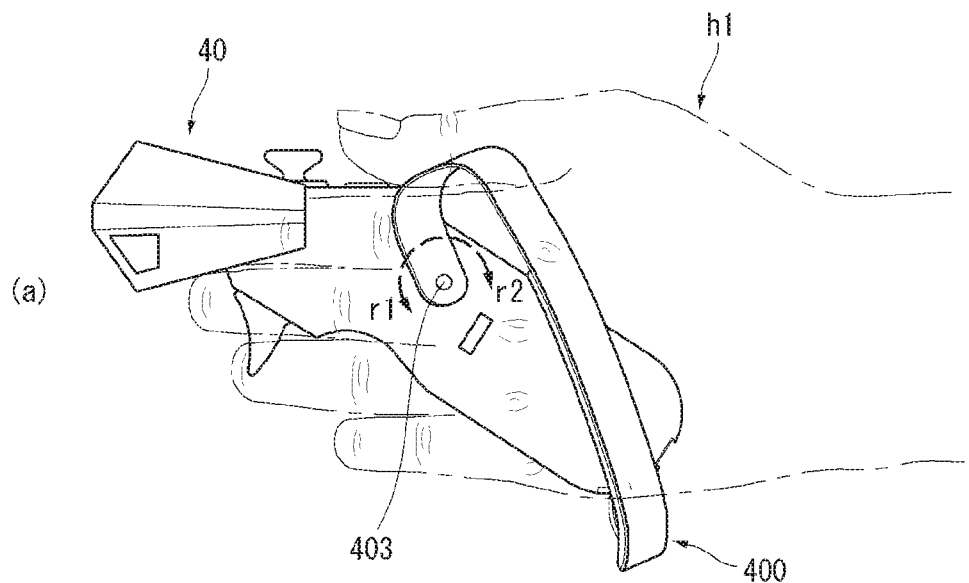
Figure 21:
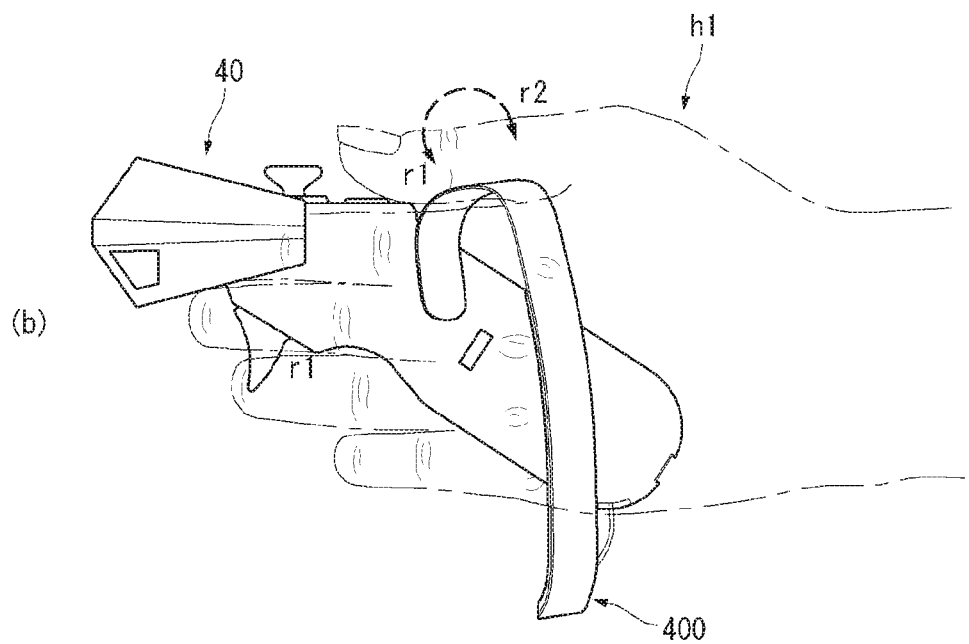

The operation of the controller 40 and the strap tension adjuster 410 according to the user's manipulation is described below with reference to FIGS. 19, 20, and 21. For ease of description, a state in which the controller 40 is not in use by the user and another in which the controller 40 is used by the user are described in order.

Figure 19:
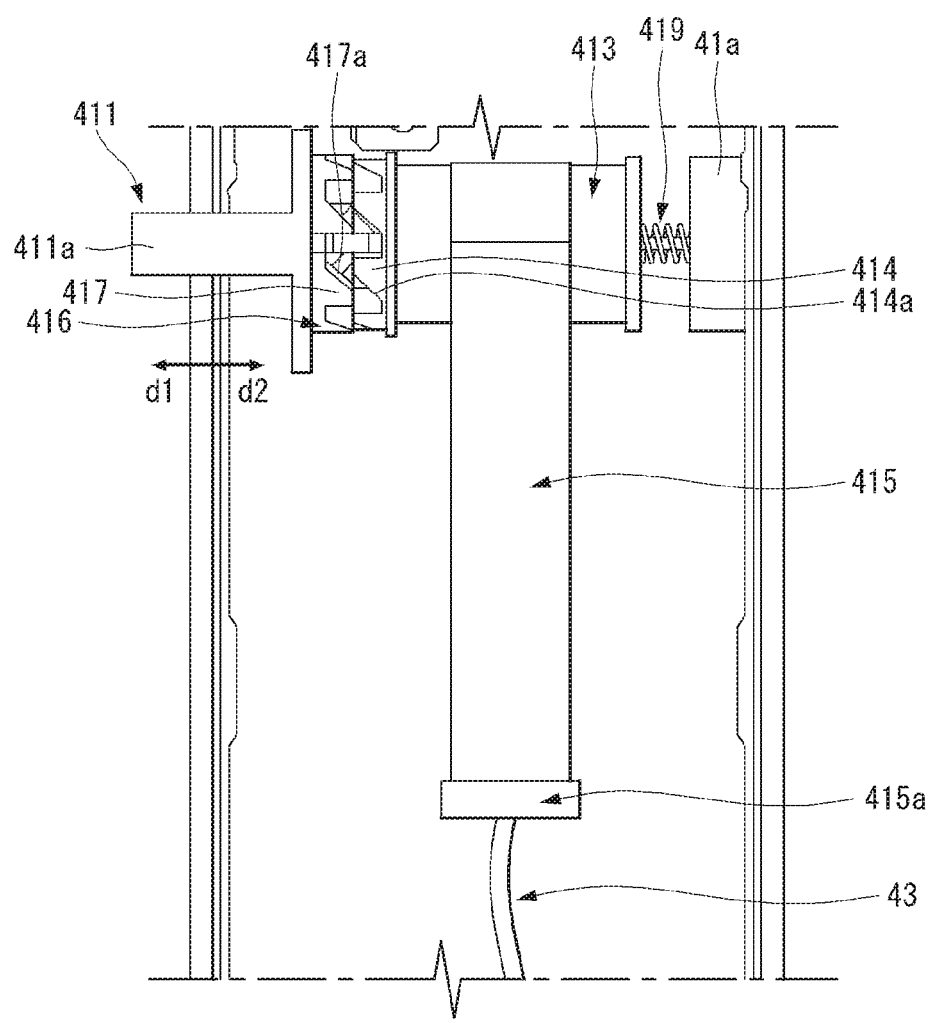
FIG. 19 is a view illustrating an inside of a controller handle according to an embodiment of the present disclosure.

FIG. 19 is a view illustrating an inside of a handle of a controller according to an embodiment of the present disclosure. FIGS. 20 and 21 are views illustrating an example of using the controller according to an embodiment of the present disclosure.

While not in use, the controller 40 need not be positioned to allow the user to grip the handle 41, thus the strap portion 400 is assumed to be in a first state where it is closest to the handle 41.

In the first state, the first spring 415 shown in FIG. 19 remains mostly wound around the body 413a of the first gear 413 and, thus, the connecting element 43 connected to the second end 415a of the first spring 415 is mostly positioned inside the handle 41.

To grip the handle 41, the user sufficiently spaces the strap portion 400 away from the handle 41, thereby securing a wide space between the strap portion 400 and the handle 41.

In the second state where the strap portion 400 stays away from the handle 41, the first end 401a of the strap portion 400 travels longer from the handle 41 than the second end of the strap portion 400 fastened to the handle 41, so that the connecting element 43 connected with the first end 401a of the strap portion 400 is tensioned to pull the connecting element 43 and the second end 415a of the first spring.

In this case, since the first slope surfaces 414a formed in the first sawteeth 414 are slidable over the second slope surfaces 417a formed in the second sawteeth 417 although the first sawteeth 414 are engaged with the second sawteeth 417, the first gear 413 connected with the first spring 415 may be spun in the first direction a1.

Therefore, the first gear 413 is spun in the first direction a1 by the tension of the first spring 415 but not in the second direction a2 by steady engagement between the first sawteeth 414 and the second sawteeth 417. In other words, by the engagement between the first gear 413 and the second gear 416, the first spring 415 is extended towards the opening 44 of the handle 41 and remains in the extending position.

The user may secure a wide space between the strap portion 400 and the handle 41 by spacing the first end 401a of the strap portion 400 away from the handle 41. The user may put her left hand h1 through the secured space and grip the handle 41 as shown in FIG. 20.

If the strap portion 400 remains spaced away from the handle 41 while the user holds the handle 41 in her left hand h1, the user's left hand h1 does not come in tight contact with the handle 41. The user may press the button part 411a of the link button 411, tightening up the strap portion 400 on the user's left hand h1.

If the user presses the button part 411a of the link button 411 with her left hand, the first arm 412 of the link button 411 slides through the receiving groove 418 formed in the second gear 416, pushing away the first gear 413. As the first gear 413 is pushed away, the engagement between the first gear 413 and the second gear 416 is released, allowing the first gear 413 to spin in the second direction a2.

Since the tension on the connecting element 43 is released by the user, the first spring 415 is elastically restored so that the first gear 413 is pushed away from the second gear 416 by the first arm 412 to be enabled to spin in the second direction a2. Thus, the first gear 413 is spun in the second direction a2 by the elastic restoring force of the first spring 415.

If the strap portion 400 becomes tight enough to bring the user's left hand hl in tight contact with the handle 41, the elastic restoration of the first spring 415 ends, and the first gear 413 stops spinning in the second direction a2.

As the strap portion 400 tightly holds the handle 41 in the user's left hand hl, the controller may be prevented from escaping off the user's hand, and a space may be secured between the handle 41 and the strap portion 400 by simple manipulation of the strap portion 400. This way may significantly enhance the use convenience of the controller.

If the user shakes her hand with the strap portion 400 holding the handle 41 in the hand, the strap portion 400 may be freely rotated in a direction r1 or r2 around the hinge shaft 403. In other words, as the second end of the strap portion 400 is fastened to the handle 41 to be freely rotatable in the direction r1 or r2 around the hinge shaft 403, the user's hand motion is not disturbed by the strap portion 400.

According to the present disclosure, the strap tension adjuster may be made compact by simplifying the components as compared with the prior art, thus contributing to reducing the overall size and volume of the controller 40.

Particular embodiments or other embodiments of the present disclosure described above are not mutually exclusive to each other or distinguishable from each other. Individual structures or functions of particular embodiments or other embodiments of the present disclosure described above may be used in parallel therewith or in combination thereof.

For example, it means that structure A described with reference to a specific embodiment and/or figure and structure B described with reference to other embodiment and/or figure may be combined together. In other words, even if a combination of two different structures is not explicitly indicated, it should be understood that combination thereof is possible unless otherwise stated as impossible.

The detailed descriptions above should be regarded as being illustrative rather than restrictive in every aspect. The technical scope of the present disclosure should be determined by a reasonable interpretation of the appended claims, and all of the modifications that fall within an equivalent scope of the present disclosure belong to the technical scope of the present disclosure.

DESCRIPTION OF DENOTATIONS

10: cloud network
20: electronic device
400: strap portion
410: strap tension adjuster
411: link button
413: first gear
415: first spring
416: second gear
419: second spring
420: pin

What is claimed is:

1. An electronic device for interacting with content provided from an augmented reality (AR) or a virtual reality (VR) device, the electronic device comprising:
   a strap portion of which both ends are coupled to a handle of the electronic device; and
   a strap tension adjuster disposed inside the handle, wherein the strap tension adjuster comprises:
   a link button disposed to partially protrude to an outside of the handle;
   a first spring coupled with one end of the strap portion;
   a first gear around which the first spring is wound and rotatable in a first direction, wherein the first gear comprises first sawteeth with first slope sides inclined in the first direction; and
   a second gear coupled and fastened to the link button so as not to be rotatable, wherein the second gear comprises second sawteeth with second slope sides inclined in a second direction,
   wherein the strap portion remains in a second state when the strap portion turns from a first state in which the handle and the strap portion are positioned adjacent to each other to the second state in which the strap portion is positioned away from the handle and the strap portion turns back to the first state when the link button is pressed,
   wherein the first gear is spinnable in the second direction opposite to the first direction when the link button is pressed, and
   wherein the first sawteeth and the second sawteeth are symmetrically positioned such that the first slope sides face the second slope sides.

2. The electronic device of claim 1, wherein the second gear comprises a receiving groove for receiving a portion of the link button.

3. The electronic device of claim 2, wherein the receiving groove has openings formed in both ends thereof to allow the portion of the link button to move along a straight line inside the receiving groove.

4. The electronic device of claim 3, wherein the portion of the link button comprises a first arm.

5. The electronic device of claim 4, wherein the first arm is longer than the receiving groove, wherein the first arm is disposed to be slidable in the receiving groove, and wherein the first arm pushes the first gear away from the second gear based on the link button being pressed.

6. The electronic device of claim 1, wherein the first spring is a spiral spring.

7. The electronic device of claim 6, wherein the first spring is disposed so that a central axis of the first spring is coaxial with a rotation axis of the first gear.

8. The electronic device of claim 1, wherein the strap tension adjuster further comprises a second spring elastically supporting the first gear, and wherein the second spring is disposed so that a central axis of the second spring is coaxial with a rotation axis of the first gear.

9. The electronic device of claim 8, wherein the second spring is positioned inside the first gear.

10. The electronic device of claim 8, further comprising a pin supporting the first gear and the second gear to be placed in a predetermined position inside the handle, wherein the pin is disposed inside the handle so that a central axis of the pin is coaxial with the rotation axis of the first gear.

11. The electronic device of claim 10, wherein the pin passes through the first gear and the second gear along the rotation axis of the first gear, and wherein the second spring is coupled with the pin.

12. The electronic device of claim 10, wherein one end or both ends of the pin are fastened to an inner wall of the handle.

13. The electronic device of claim 1, further comprising a connecting element connecting an end of the strap portion with the first spring.

14. The electronic device of claim 1, wherein another end of the strap portion is rotatably connected to the handle.

\* \* \* \* \*